US012030578B2

(12) United States Patent
Hara et al.

(10) Patent No.: US 12,030,578 B2
(45) Date of Patent: Jul. 9, 2024

(54) LEANING-VEHICLE-STEERING-ACTUATOR CONTROLLER AND LEANING VEHICLE

(71) Applicant: YAMAHA HATSUDOKI KABUSHIKI KAISHA, Iwata (JP)

(72) Inventors: Nobuo Hara, Shizuoka (JP); Hidekazu Tsuboi, Shizuoka (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 703 days.

(21) Appl. No.: 17/187,440

(22) Filed: Feb. 26, 2021

(65) Prior Publication Data

US 2021/0179225 A1 Jun. 17, 2021

Related U.S. Application Data

(63) Continuation-in-part of application No. PCT/JP2019/034103, filed on Aug. 30, 2019.

(30) Foreign Application Priority Data

Aug. 30, 2018 (JP) ................................. 2018-161336

(51) Int. Cl.
*B62K 11/00* (2006.01)
*B62K 5/08* (2006.01)
(Continued)

(52) U.S. Cl.
CPC ............. *B62K 11/007* (2016.11); *B62K 5/08* (2013.01); *B62K 5/10* (2013.01); *B62K 21/12* (2013.01)

(58) Field of Classification Search
CPC .......... B62K 11/007; B62K 5/08; B62K 5/10; B62K 21/10; B62K 21/12
See application file for complete search history.

(56) References Cited

U.S. PATENT DOCUMENTS

| 10,232,904 B2 | 3/2019 | Toyota et al. | |
|---|---|---|---|
| 2005/0126832 A1* | 6/2005 | Amsbury | B60L 15/20 180/7.1 |
| 2008/0290618 A1* | 11/2008 | Yanaka | B60G 17/0195 280/6.15 |

(Continued)

FOREIGN PATENT DOCUMENTS

| JP | 2009132271 A | 6/2009 |
|---|---|---|
| JP | 2013023166 A | 2/2013 |

(Continued)

*Primary Examiner* — Jacob D Knutson
*Assistant Examiner* — Abigail R Hymel
(74) *Attorney, Agent, or Firm* — Rabin & Berdo, P.C.

(57) ABSTRACT

A leaning vehicle including a vehicle body frame, at least one steerable wheel, a handlebar, of which the manipulation by a rider generates a steering torque, a steering actuator steering the at least one steerable wheel, a roll rate sensor detecting a roll rate of the vehicle body frame, and a steering actuator controller. The steering actuator controller includes a torque estimation section that receives an input to thereby generate an estimated value of the steering torque, and a current determination section that obtains a control current based on the estimated valued of the steering torque generated by the torque estimation section, and outputs the control current to the steering actuator to control the steering actuator. The input of the torque estimation section includes the roll rate obtained from the roll rate sensor, but is free from any value of the steering torque detected by a torque sensor.

9 Claims, 16 Drawing Sheets

(51) Int. Cl.
*B62K 5/10* (2013.01)
*B62K 21/12* (2006.01)

(56) References Cited

U.S. PATENT DOCUMENTS

| | | | | |
|---|---|---|---|---|
| 2009/0105908 | A1* | 4/2009 | Casey | A63C 17/12 |
| | | | | 701/41 |
| 2009/0240399 | A1* | 9/2009 | Dagenais | B62K 5/05 |
| | | | | 701/42 |
| 2011/0006498 | A1* | 1/2011 | Mercier | B62D 9/02 |
| | | | | 280/124.103 |
| 2011/0118941 | A1 | 5/2011 | Linker et al. | |
| 2014/0124286 | A1* | 5/2014 | Hayashi | B62K 5/10 |
| | | | | 180/400 |
| 2016/0375948 | A1* | 12/2016 | Takenaka | B62K 5/08 |
| | | | | 280/5.506 |
| 2017/0008591 | A1* | 1/2017 | Abbott | B62K 5/08 |
| 2017/0050693 | A1* | 2/2017 | Matties | B60G 3/20 |
| 2018/0134336 | A1* | 5/2018 | Yoshino | B62D 9/02 |
| 2018/0222276 | A1* | 8/2018 | Kimura | B62K 5/10 |
| 2018/0265158 | A1 | 9/2018 | Hara et al. | |
| 2018/0319436 | A1* | 11/2018 | Kato | B62K 5/027 |
| 2019/0016381 | A1* | 1/2019 | Simon | B62K 5/10 |
| 2019/0016405 | A1* | 1/2019 | Huang | B62K 5/10 |
| 2019/0210644 | A1* | 7/2019 | Uchiyama | B62J 45/414 |
| 2021/0331762 | A1* | 10/2021 | Mighell | B62K 5/10 |

FOREIGN PATENT DOCUMENTS

| | | |
|---|---|---|
| JP | 2013144471 A | 7/2013 |
| JP | 2014091506 A | 5/2014 |
| WO | 2016175263 A1 | 11/2016 |
| WO | 2017086352 A1 | 5/2017 |
| WO | 2018073913 A1 | 4/2018 |

\* cited by examiner

Fig. 1A
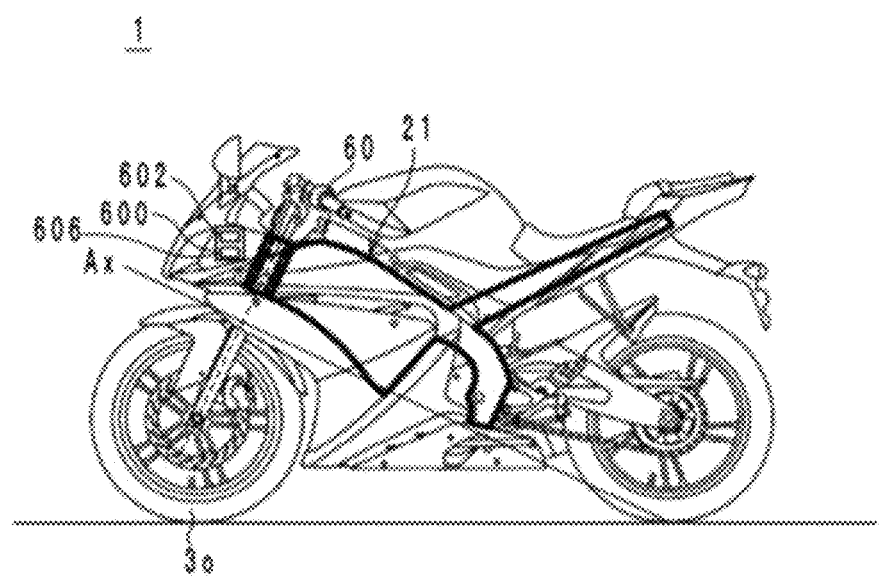
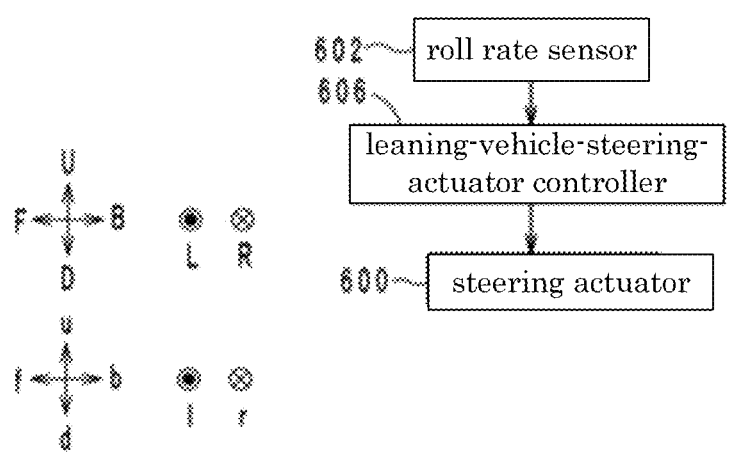

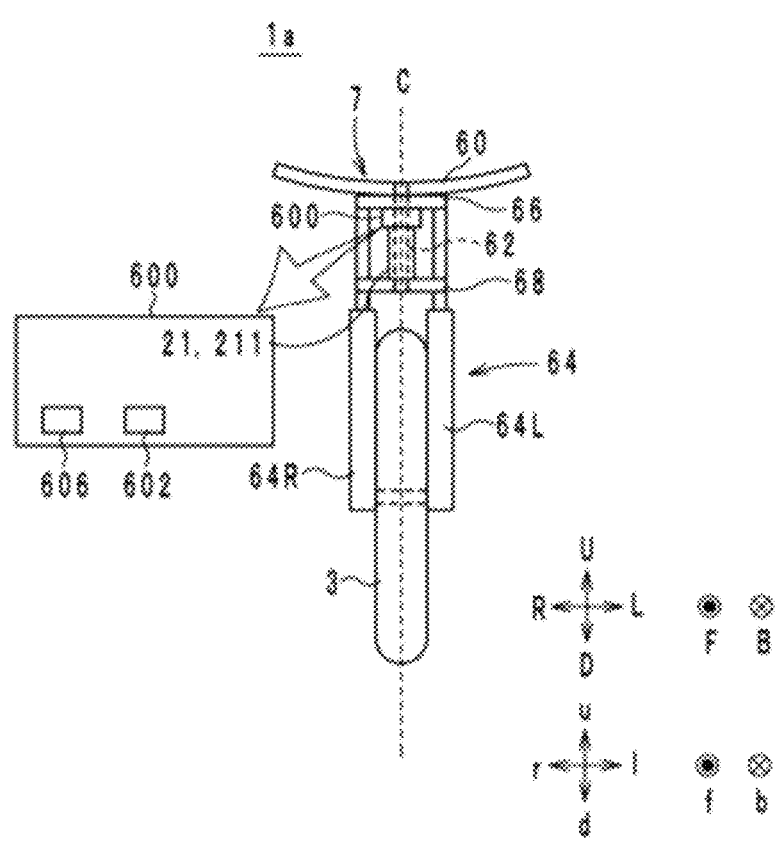

Fig. 11
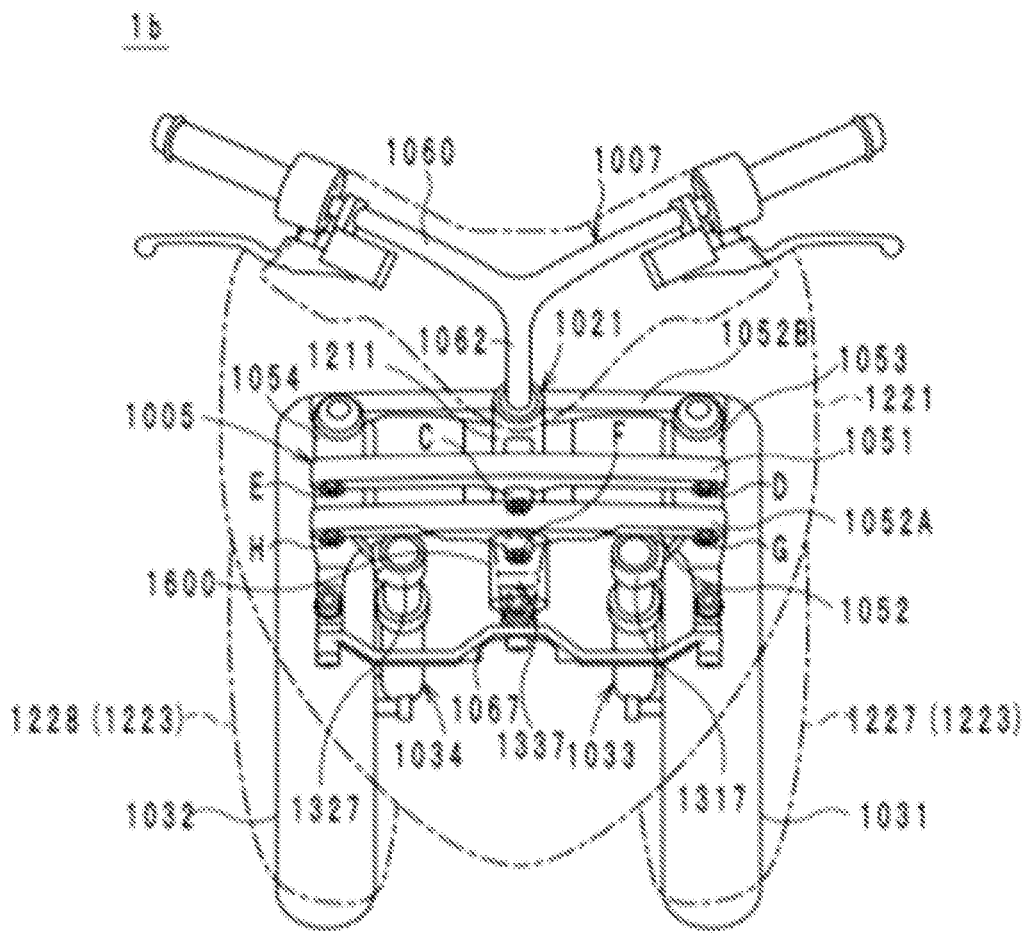
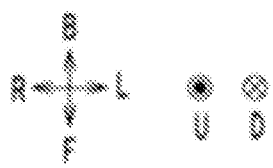
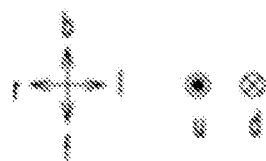

Fig. 12
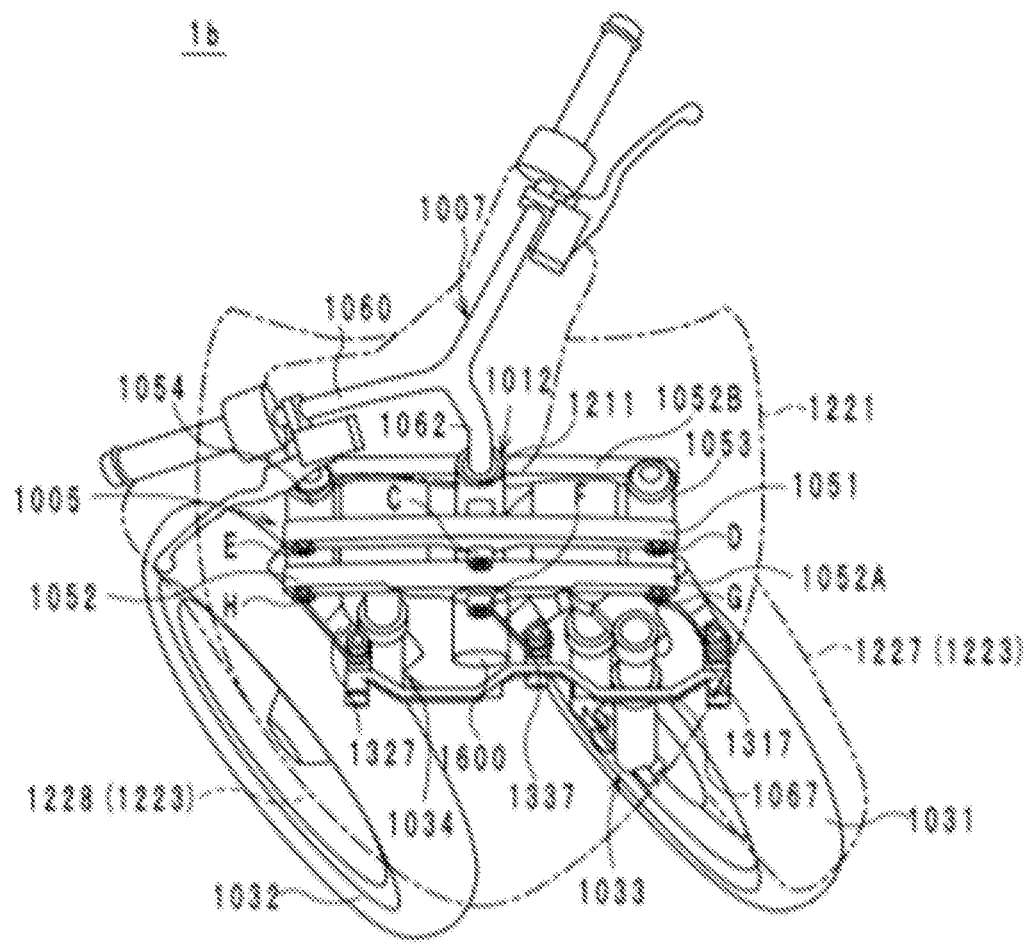
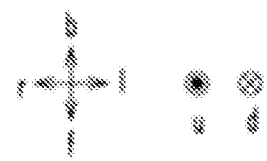

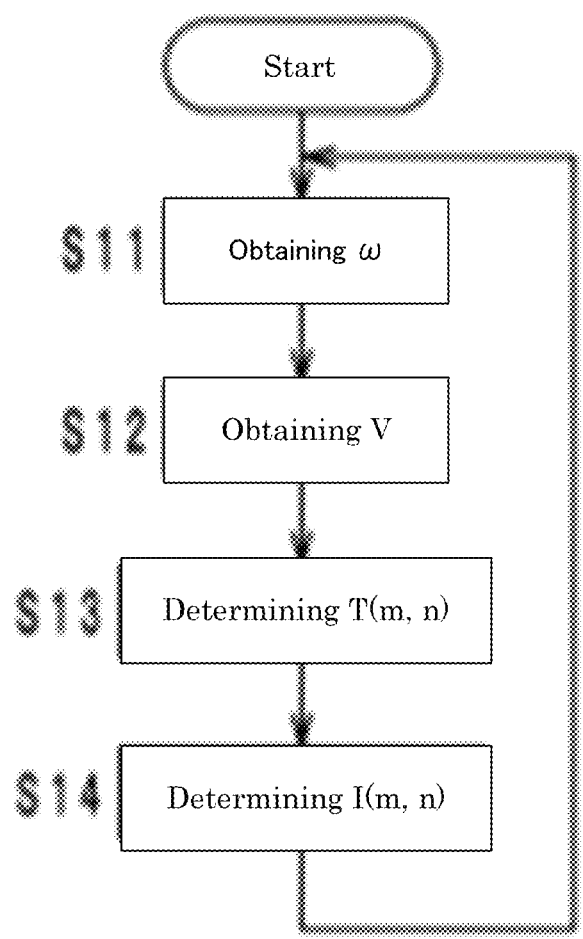

US 12,030,578 B2

LEANING-VEHICLE-STEERING-ACTUATOR CONTROLLER AND LEANING VEHICLE

CROSS-REFERENCE TO RELATED APPLICATIONS

This is a continuation-in-part application of International Application PCT/JP2019/034103 filed on Aug. 30, 2019, which claims priority from a Japanese Patent Application No. 2018-161336, filed on Aug. 30, 2018. The contents of the applications are incorporated herein by reference.

TECHNICAL FIELD

The present teaching relates to a leaning-vehicle-steering-actuator controller controlling a steering actuator configured to output a steering torque, and a leaning vehicle.

BACKGROUND ART

For example, a leaning vehicle as disclosed in Patent Literature 1 is known as a conventional leaning vehicle. The leaning vehicle includes a vehicle body frame, a steerable wheel, a steering torque transmission mechanism, a steering torque detector, and a motor.

When the leaning vehicle is turning left, the vehicle body frame leans in a leaning-vehicle-leftward direction, and when the leaning vehicle is turning right, the vehicle body frame leans in a leaning-vehicle-rightward direction. The steerable wheel is supported by the vehicle body frame. The steering torque transmission mechanism includes a steering shaft and a handlebar assembly. The steering shaft is supported by the vehicle body frame in a rotatable manner. The handlebar assembly is connected to the steering shaft directly or indirectly. When a rider manipulates the handlebar assembly, the steering torque transmission mechanism steers the steerable wheel via the steering shaft. The steering torque detector detects the steering torque inputted to the steering torque transmission mechanism. The motor generates a torque to assist the rider in his/her steering action, based on the steering torque detected by the steering torque detector.

CITATION LIST

Patent Literature

Patent Literature 1: International Patent Application Publication WO2016/175263

SUMMARY OF INVENTION

Technical Problem

New suggestions about a steering actuator controller as described above are demanded.

An object of the present teaching is to provide a leaning-vehicle-steering-actuator controller that controls a steering actuator in an unconventional manner, and a leaning vehicle.

Solution to Problem

In the leaning vehicle disclosed in Patent Literature 1, the steering torque detector detects the steering torque acting on the steering shaft, and the actuator (motor) generates a torque to assist the rider's manipulation, based on the steering torque. However, the present inventors conducted studies while considering the actuator as not a device for assisting the rider's manipulation but a device for controlling the posture of the vehicle body frame. Then, the present inventors conducted studies about what action the rider takes for a roll angle change of the vehicle body frame, which is an example of a posture change of the vehicle body frame.

In order to change the roll angle of the vehicle body frame, the rider applies a steering force to the handlebar. Then, the steering force is transmitted from the handlebar to the steering shaft, and a steering torque is applied to the steering shaft. In accordance with the steering torque, the steering shaft rotates, and the steerable wheel is steered. When the steerable wheel is steered, the roll angle of the vehicle body frame changes. In other words, the posture of the vehicle body frame changes. Thus, the rider controls the posture of the vehicle body frame by using the steering torque applied to the steering shaft as an input parameter.

The greater the absolute value of the steering force (i.e., steering torque) is, the greater the absolute value of the rate of change of the roll angle (i.e., roll rate) of the vehicle body frame is. Also, the smaller the absolute value of the steering force (i.e., steering torque) is, the smaller the absolute value of the roll rate of the vehicle body frame is. Accordingly, the present inventors obtained a view that there is a correlation between the steering torque and the roll rate. Then, the present inventors conceived of an idea that the roll rate, instead of the steering torque, can be used as an input parameter for posture control of the vehicle body frame. In other words, the present inventors conceived of detecting the roll rate and controlling the posture of the vehicle body frame based on the roll rate.

In order to solve the problem above, the present teaching employs the following configurations.

(1) A leaning-vehicle-steering-actuator controller for a leaning vehicle, the leaning vehicle including:
  a vehicle body frame configured to lean in a leaning-vehicle-leftward direction when the leaning vehicle is turning left and to lean in a leaning-vehicle-rightward direction when the leaning vehicle is turning right;
  at least one steerable wheel supported by the vehicle body frame;
  a handlebar configured to be manipulated by a rider to steer the at least one steerable wheel, and supported by the vehicle body frame in a rotatable manner;
  a steering actuator configured to apply a torque to the at least one steerable wheel to steer the at least one steerable wheel; and
  a roll rate sensor configured to detect a roll rate that is an amount of change per unit time of a roll angle of the vehicle body frame around a roll axis extending along a leaning-vehicle-front-back direction, the roll angle changing as the vehicle body frame is rotating around the roll axis;
  wherein the leaning-vehicle-steering-actuator controller controls the steering actuator by using the roll rate sensor without using a torque sensor configured to detect a torque generated around a rotation axis of the handlebar by a rider's manipulation and based on the roll rate obtained from the roll rate sensor, not the torque detected by the torque sensor as the torque generated around the rotation axis of the handlebar by the rider's manipulation.

The leaning-vehicle-steering-actuator controller of (1) can control the steering actuator in an unconventional manner. More specifically, in order to change the roll angle of the vehicle body frame, the rider manipulates the handlebar to generate a steering torque around the rotation axis of the handlebar. Then, the roll angle of the vehicle body frame changes, and the posture of the vehicle body frame changes. Thus, the rider can control the posture of the vehicle body frame by using the steering torque applied to the steering shaft as an input parameter.

The greater the absolute value of the steering torque is, the greater the absolute value of the roll rate, which is the rate of change of the roll angle of the vehicle body frame, is. The smaller the absolute value of the steering torque is, the smaller the absolute value of the roll rate of the vehicle frame is. Thus, there is a correlation between the steering torque and the roll rate. Therefore, instead of the steering torque, the roll rate can be used as an input parameter for posture control of the vehicle body frame. Accordingly, the leaning-vehicle-steering-actuator controller of (1) controls the steering actuator based on the roll rate.

For the following reason, the leaning-vehicle-steering-actuator controller of (1) controls the steering actuator without using the torque sensor configured to detect the steering torque and not based on the steering torque detected by the torque sensor. There is a correlation between the steering torque and the roll rate, and therefore, the steering torque does not need to be detected if the roll rate is detected. Accordingly, the leaning-vehicle-steering-actuator controller can control the steering actuator not based on the steering torque, which is conventionally used for control of the steering actuator.

For the reason above, the leaning-vehicle-steering-actuator controller of (1) can control the steering actuator by using the roll rate sensor without using the torque sensor configured to detect the steering torque, and based on the roll rate obtained from the roll rate sensor, not the steering torque detected by the torque sensor. Thus, the leaning-vehicle-steering-actuator controller of (1) can control the steering actuator in an unconventional manner.

The leaning-vehicle-steering-actuator controller of (1) does not use the steering torque for control of the steering actuator. Accordingly, a leaning vehicle including the leaning-vehicle-steering-actuator controller of (1) does not need to include a torque sensor configured to detect the steering torque. However, the leaning vehicle including the leaning-vehicle-steering-actuator controller of (1) may include a torque sensor configured to detect the steering torque.

(2) The leaning-vehicle-steering-actuator controller according to (1), wherein the leaning-vehicle-steering-actuator controller controls the steering actuator by using the roll rate sensor using neither the torque sensor configured to detect the torque generated around the rotation axis of the handlebar by the rider's manipulation nor a roll sensor configured to detect the roll angle, and based on the roll rate obtained from the roll rate sensor, neither the torque detected by the torque sensor nor the roll angle detected by the roll sensor.

The leaning-vehicle-steering-actuator controller of (2) can control the steering actuator in an unconventional manner. More specifically, the present inventors also conducted studies about the correlation between the steering torque and the roll angle. As a result, the inventors found that the correlation between the steering torque and the roll angle is not so high as the correlation between the steering torque and the roll rate in a transient state where a roll rate is generated. Then, the leaning-vehicle-steering-actuator controller controls the steering actuator by using the roll rate sensor with using neither the torque sensor configured to detect the steering torque nor the roll sensor configured to detect the roll angle, and based on the roll rate obtained from the roll rate sensor, neither the steering torque detected by the torque sensor nor the roll angle detected by the roll sensor. Thus, the leaning-vehicle-steering-actuator controller of (2) can control the steering actuator in an unconventional manner.

(3) The leaning-vehicle-steering-actuator controller according to (1) or (2), wherein:
the leaning vehicle further includes a speed sensor configured to detect a speed of the leaning vehicle; and
the leaning-vehicle-steering-actuator controller controls the steering actuator by using the roll rate sensor and the speed sensor without using the torque sensor configured to detect the torque generated around the rotation axis of the handlebar by the rider's manipulation and based on the roll rate obtained from the roll rate sensor and the speed of the leaning vehicle obtained from the speed sensor, not the torque detected by the torque sensor as the torque generated around the rotation axis of the handlebar by the rider's manipulation.

The leaning-vehicle-steering-actuator controller of (3) can control the steering actuator in an unconventional manner. As described below, there is a correlation between the posture change of the vehicle body frame and the speed of the leaning vehicle. As the absolute value of the speed of the leaning vehicle is increasing, the absolute value of the rotation speed of the steerable wheel becomes greater, and the absolute value of the angular momentum of the steerable wheel becomes greater. Then, an external force of a greater absolute value is needed to change the angular momentum of the steerable wheel, and it becomes harder to change the posture of the vehicle body frame. On the other hand, as the absolute value of the speed of the leaning vehicle is decreasing, the absolute value of the rotation speed of the steerable wheel becomes smaller, and the absolute value of the angular momentum of the steerable wheel becomes smaller. Then, an external force of a smaller absolute value is needed to change the angular momentum of the steerable wheel, and it becomes easier to change the posture of the vehicle body frame. Therefore, the leaning-vehicle-steering-actuator controller of (3) controls the steering actuator based on the speed of the leaning vehicle. Thus, the leaning-vehicle-steering-actuator controller of (3) can control the steering actuator in an unconventional manner.

(4) The leaning-vehicle-steering-actuator controller of any one of (1) to (3), wherein:
the leaning vehicle further includes a speed sensor configured to detect a speed of the leaning vehicle; and
the leaning-vehicle-steering-actuator controller estimates an estimated steering torque, which is an estimated value of the torque generated around the rotation axis of the handlebar by the rider's manipulation, by using the roll rate sensor and the speed sensor without using the torque sensor configured to detect the torque generated around the rotation axis of the handlebar by the rider's manipulation, and based on the roll rate obtained from the roll rate sensor and the speed of the leaning vehicle obtained from the speed sensor, not the torque detected by the torque sensor as the torque generated around the rotation axis of the handlebar by the rider's manipulation, and controls the steering actuator based on the estimated steering torque.

The leaning-vehicle-steering-actuator controller of (4) can control the steering actuator in an unconventional manner. As described below, there is a correlation between the posture change of the vehicle body frame and the speed of the leaning vehicle. As the absolute value of the speed of the leaning vehicle is increasing, the absolute value of the rotation speed of the steerable wheel becomes greater, and the absolute value of the angular momentum of the steerable wheel becomes greater. Then, an external force of a greater absolute value is needed to change the angular momentum of the steerable wheel, and it becomes harder to change the posture of the vehicle body frame. On the other hand, as the absolute value of the speed of the leaning vehicle is decreasing, the absolute value of the rotation speed of the steerable wheel becomes smaller, and the absolute value of the angular momentum of the steerable wheel becomes smaller. Then, an external force of a smaller absolute value is needed to change the angular momentum of the steerable wheel, and it becomes easier to change the posture of the vehicle body frame. Therefore, the leaning-vehicle-steering-actuator controller of (4) estimates an estimated steering torque, which is an estimated value of the steering torque by using the roll rate sensor and the speed sensor configured to detect the speed of the leaning vehicle without using the torque sensor configured to detect the steering torque, and based on the roll rate obtained from the roll rate sensor and the speed of the leaning vehicle obtained from the speed sensor, not the steering torque detected by the torque sensor, and the leaning-vehicle-steering-actuator controller of (4) controls the steering actuator based on the estimated steering torque. Thus, the leaning-vehicle-steering-actuator controller of (4) can control the steering actuator in an unconventional manner.

(5) A leaning vehicle comprising:
  a vehicle body frame configured to lean in a leaning-vehicle-leftward direction when the leaning vehicle is turning left and to lean in a leaning-vehicle-rightward direction when the leaning vehicle is turning right;
  at least one steerable wheel supported by the vehicle body frame;
  a handlebar configured to be manipulated by a rider to steer the at least one steerable wheel, and supported by the vehicle body frame in a rotatable manner;
  a steering actuator configured to apply a torque to the at least one steerable wheel to steer the at least one steerable wheel; and
  a roll rate sensor configured to detect a roll rate that is an amount of change per unit time of a roll angle of the vehicle body frame around a roll axis extending along a leaning-vehicle-front-back direction, the roll angle changing as the vehicle body frame is rotating around the roll axis; and
  the leaning-vehicle-steering-actuator controller according to any one of (1) to (4).

For the same reasons as described in connection with the leaning-vehicle-steering-actuator controllers of (1) to (4), the leaning vehicle of (5) can control the steering actuator in an unconventional manner.

(6) The leaning vehicle according to (5), wherein the roll rate sensor is supported by the vehicle body frame in such a manner as not to be displaceable relative to the vehicle body frame.

This arrangement in the leaning vehicle of (6) inhibits a great delay of a posture change of the roll rate sensor from a posture change of the vehicle body frame.

Some embodiments of the present teaching will hereinafter be described in detail with reference to the drawings, and the detailed description of the embodiments will provide a clearer picture of the above-mentioned object and other objects, the features, the aspects and the advantages of the present teaching.

The term "and/or" used herein includes one of the associated items in a list and all possible combinations of the associated items.

The terms "including", "comprising", or "having", and variations thereof used herein specify the presence of stated features, steps, operations, elements, components, and/or equivalents thereof, and can include one or more of steps, operations, elements, components, and/or their groups.

Unless otherwise defined, all terms (including technical and scientific terms) used herein have the same meaning as commonly understood by one of ordinary skilled in the art to which the present teaching pertains.

It should be understood that terms, such as those defined in commonly used dictionaries, should be interpreted as having a meaning that is consistent with their meaning in the context of the present disclosure and relevant art and should not be interpreted in an idealized or overly formal sense unless expressly so defined herein.

It should be understood that the description of the present teaching discloses a number of techniques and steps. Each of these has individual benefit, and each can also be used in conjunction with one or more, or in some cases all, of the other disclosed techniques. Accordingly, for the sake of clarity, this description will refrain from repeating every possible combination of the individual steps in an unnecessary fashion. Nevertheless, Description and Claims should be read with the understanding that such combinations are entirely within the scope of the present teaching and the claims.

In the description given below, for the purpose of explanation, numerous specific details are set forth in order to provide a complete understanding of the present teaching. It will be apparent, however, that those skilled in the art may practice the present teaching without these specific details. The present disclosure is to be considered as an exemplification of the present teaching, and is not intended to limit the present teaching to the specific embodiments illustrated by drawings or descriptions below.

Advantageous Effect of Invention

The present teaching makes it possible to control a steering actuator in an unconventional manner.

BRIEF DESCRIPTION OF DRAWINGS

FIG. 1A is a looking-to-the-right (R) view of a leaning vehicle 1.

FIG. 2 is a schematic looking-to-the-back (B) view of the leaning vehicle 1*a*.

FIG. 11 is a looking-to-the-down (d) view of the front part of the leaning vehicle 1b when the vehicle body frame 1021 is in an upright posture.

FIG. 12 is a looking-to-the-down (d) view of the front part of the leaning vehicle 1b when the leaning vehicle 1b is steered leftward.

FIG. 15 is a flowchart showing operations carried out by the actuator controller 1606.

DESCRIPTION OF EMBODIMENTS (Outline)

Figure 1B:
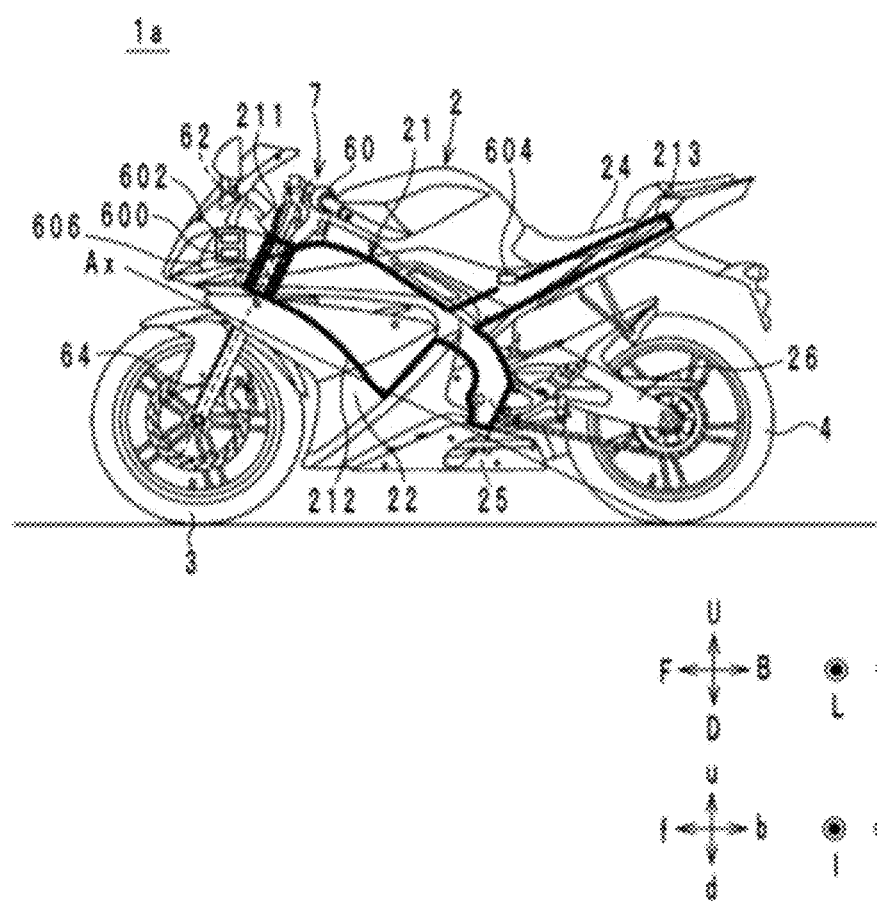
FIG. 1B is a looking-to-the-right (R) view of a leaning vehicle 1*a*.

The overall structure of a leaning vehicle 1 according to the gist of the present teaching will hereinafter be described with reference to the drawings. In the present embodiment, a two-wheeled leaning vehicle (which will hereinafter be referred to simply as a leaning vehicle) including a vehicle body frame capable of leaning, a front wheel and a rear wheel is described as an example of a leaning vehicle. FIG. 1A is a looking-to-the-right (R) view of the leaning vehicle 1.

The leaning vehicle 1 includes at least one steerable wheel 3o, a vehicle body frame 21, a handlebar 60, a steering actuator 600, a roll rate sensor 602, and a leaning-vehicle-steering-actuator controller 606.

The vehicle body frame 21 leans in a leaning-vehicle-leftward direction when the leaning vehicle 1 is turning left and leans in a leaning-vehicle-rightward direction when the leaning vehicle 1 is turning right. The at least one steerable wheel 3o is supported by the vehicle body frame 21. The at least one steerable wheel 3o may include two or more steerable wheels.

The handlebar 60 is to be manipulated by a rider to steer the at least one steerable wheel 3o. The handlebar 60 is supported by the vehicle body frame 21 in a rotatable manner. The handlebar 60 is connected to a steering shaft extending along a vehicle-body-frame-up-down direction. The steering shaft is supported by the vehicle body frame 21. Accordingly, the handlebar 60 is rotatable around a central axis of the steering shaft relative to the vehicle frame body 21. The handlebar 60 is, for example, a handlebar extending along a vehicle-body-left-right direction.

The steering actuator 600 applies a torque to the at least one steerable wheel 3o to steer the at least one steerable wheel 3o. Steering means causing the at least one steerable wheel 3o to rotate clockwise or counterclockwise in a vehicle-body-frame-downward view.

As the vehicle body frame 21 is rotating around a roll axis Ax extending along a leaning-vehicle-front-back direction, the roll angle changes, and the roll rate sensor 602 is configured to detect the roll rate that is the amount of change per unit time of the roll angle.

The leaning-vehicle-steering-actuator controller 606 is used for the leaning vehicle 1, which includes at least one steerable wheel 3o, a vehicle body frame 21, a handlebar 60, a steering actuator 600 and a roll rate sensor 602. The leaning-vehicle-steering-actuator controller 606 does not use a torque sensor that detects the steering torque T that is generated by the rider's manipulation and acts around the rotation axis of the handlebar 60, and uses the roll rate sensor 602. Then, the leaning-vehicle-steering-actuator controller 606 controls the steering actuator 600 not based on the steering torque T that is detected by the torque sensor as the torque generated by the rider's manipulation and acting around the rotation axis of the handlebar 60 but based on the roll rate obtained from the roll rate sensor 602.

The leaning-vehicle-steering-actuator controller 606 can control the steering actuator 600 in an unconventional manner. More specifically, in order to change the roll angle of the vehicle body frame 21, the rider manipulates the handlebar 60 to generate a steering torque (i.e., the first steering torque) that acts around the rotation axis of the handlebar 60. Then, the roll angle of the vehicle body frame 21 changes, and the posture of the vehicle body frame 21 changes. Thus, the rider can control the posture of the vehicle body frame 21 by using the steering torque applied to the steering shaft as an input parameter.

The greater the absolute value of the steering torque is, the greater the absolute value of the roll rate that represents the change of the roll angle of the vehicle body frame 21 is. The smaller the absolute value of the steering torque is, the smaller the absolute value of the roll rate of the vehicle body frame 21 is. Thus, there is a correlation between the steering torque and the roll rate. Therefore, for posture control of the vehicle body frame 21, the roll rate can be used as an input parameter instead of the steering torque. Then, the leaning-vehicle-steering-actuator controller 606 controls the steering actuator 600 based on the roll rate.

For the following reason, the leaning-vehicle-steering-actuator controller 606 does not use a torque sensor that detects the steering torque, and controls the steering torque actuator 600 not based on the steering torque detected by the torque sensor. There is a correlation between the steering torque and the roll rate. Accordingly, as long as the roll rate is detected, it is not necessary to detect the steering torque. Therefore, the leaning-vehicle-steering-actuator controller 606 can control the steering actuator 600 not based on the steering torque, which is conventionally used for control of a steering actuator.

For the reason above, the leaning-vehicle-steering-actuator controller 606 can control the steering actuator 600 by using the roll rate sensor 602 without using a torque sensor configured to detect the steering torque, and based on the roll rate obtained from the roll rate sensor 602, not the steering torque detected by the torque sensor. Thus, the leaning-vehicle-steering-actuator controller 606 can control the steering actuator 600 in an unconventional manner.

The leaning-vehicle-steering-actuator controller 606 does not use the steering torque for control of the steering torque actuator 600. Accordingly, the leaning vehicle 1 including the leaning-vehicle-steering-actuator controller 606 does not need to include a torque sensor configured to detect the steering torque. However, the leaning vehicle 1 including the leaning-vehicle-steering-actuator controller 606 may include a torque sensor configured to detect the steering torque.

First Embodiment

[Overall Structure]

The overall structure of a leaning vehicle 1a according to a first embodiment will hereinafter be described with reference to the drawings. In the present embodiment, as an example of the leaning vehicle, a two-wheeled leaning vehicle including a vehicle body frame capable of leaning, a front wheel and a rear wheel (the two-wheeled leaning vehicle hereinafter being referred to simply as a leaning vehicle) is described. FIG. 1B is a looking-to-the-right (R) view of the leaning vehicle 1a. FIG. 2 is a schematic looking-to-the-back (B) view of the leaning vehicle 1a. In FIG. 2, the leaning vehicle 1*a* is in an upright posture. Since FIG. 2 is a schematic view, there are some inconsistencies in size, etc. between FIG. 1B and FIG. 2. FIG. 2 shows only principal parts, and a vehicle body cover 22 is omitted in FIG. 2.

In the following paragraphs, a forward direction in a front-back direction of the leaning vehicle 1*a* is referred to as a forward direction F (leaning-vehicle-forward direction). A backward direction in the front-back direction of the leaning vehicle 1*a* is referred to as a backward direction B (leaning-vehicle-backward direction). A leftward direction in a left-right direction of the leaning vehicle 1*a* is referred to as a leftward direction L (leaning-vehicle-leftward direction). A rightward direction in the left-right direction of the leaning vehicle 1*a* is referred to as a rightward direction R (leaning-vehicle-rightward direction). An upward direction in an up-down direction of the leaning vehicle 1*a* is referred to as an upward direction U (leaning-vehicle-upward direction). A downward direction in the up-down direction of the leaning vehicle 1*a* is referred to as a downward direction D (leaning-vehicle-downward direction). The front-back direction of the leaning vehicle 1*a* is referred to as a front-back direction FB (leaning-vehicle-front-back direction). The left-right direction of the leaning vehicle 1*a* is referred to as a left-right direction LR (leaning-vehicle-left-right direction). The up-down direction of the leaning vehicle 1*a* is referred to as an up-down direction UD (leaning-vehicle-up-down direction). The forward direction in the front-back direction of the leaning vehicle 1*a* is a forward direction relative to a rider straddling the leaning vehicle 1*a*. The backward direction in the front-back direction of the leaning vehicle 1*a* is a backward direction relative to a rider straddling the leaning vehicle 1*a*. The leftward direction in the left-right direction of the leaning vehicle 1*a* is a leftward direction relative to a rider straddling the leaning vehicle 1*a*. The rightward direction in the left-right direction of the leaning vehicle 1*a* is a rightward direction relative to a rider straddling the leaning vehicle 1*a*. The upward direction in the up-down direction of the leaning vehicle 1*a* is an upward direction relative to a rider straddling the leaning vehicle 1*a*. The downward direction in the up-down direction of the leaning vehicle 1*a* is a downward direction relative to a rider straddling the leaning vehicle 1*a*.

The vehicle body frame 21 of the leaning vehicle 1*a* is capable of leaning in the leftward direction L and the rightward direction R. When the vehicle body frame 21 leans in the leftward direction L or the rightward direction R, the up-down direction and the left-right direction of the vehicle body frame 21 are not same with the up-down direction UD and the left-right direction LR of the leaning vehicle 1*a*, respectively. On the other hand, when the vehicle body frame 21 is in an upright posture, the up-down direction and the left-right direction of the vehicle body frame 21 are same with the up-down direction UD and the left-right direction LR of the leaning vehicle 1*a*, respectively. In the following paragraphs, a forward direction in the front-back direction of the vehicle body frame 21 is referred to as a forward direction f (vehicle-body-frame-forward direction). A backward direction in the front-back direction of the vehicle body frame 21 is referred to as a backward direction b (vehicle-body-frame-backward direction). A leftward direction in the left-right direction of the vehicle body frame 21 is referred to as a leftward direction l (vehicle-body-frame-leftward direction). A rightward direction in the left-right direction of the vehicle body frame 21 is referred to as a rightward direction r (vehicle-body-frame-rightward direction). An upward direction in the up-down direction of the vehicle body frame 21 is referred to as an upward direction u (vehicle-body-frame-upward direction). A downward direction in the up-down direction of the vehicle body frame 21 is referred to as a downward direction d (vehicle-body-frame-downward direction). The front-back direction of the vehicle body frame 21 is referred to as a front-back direction fb (vehicle-body-frame-front-back direction). The left-right direction of the vehicle body frame 21 is referred to as a left-right direction lr (vehicle-body-frame-left-right direction). The up-down direction of the vehicle body frame 21 is referred to as an up-down direction ud (vehicle-body-frame-up-down direction).

In the present specification, a shaft or a member that extends along the front-back direction does not necessarily mean a shaft or a member that extends in parallel to the front-back direction. A shaft or a member that extends along the front-back direction includes a shaft or a member that is inclined from the front-back direction at an angle within ±45 degrees. In a similar way, a shaft or a member that extends along the up-down direction includes a shaft or a member that is inclined from the up-down direction at an angle within ±45 degrees. A shaft or a member that extends along the left-right direction includes a shaft or a member that is inclined from the left-right direction at an angle within ±45 degrees. The upright posture of the vehicle body frame 21 means a state wherein nobody is riding the leaning vehicle 1*a*, the leaning vehicle 1*a* is out of fuel, and the front wheel is neither steered nor caused to lean.

In the present specification, a statement that a first member is supported by a second member includes a case in which the first member is attached to the second member such that the first member is immovable (that is, fixed in a place) relative to the second member and a case in which the first member is attached to the second member such that the first member is movable relative to the second member. The statement that a first member is supported by a second member also includes both a case in which the first member is directly attached to the second member and a case in which the first member is attached to the second member via a third member.

In the present specification, a statement that a first member and a second member are arranged in the front-back direction means the following situation. When the first member and the second member are viewed in a direction perpendicular to the front-back direction, both the first member and the second member are on an arbitrary line indicating the front-back direction. In the present specification, a statement that a first member and a second member are arranged in the front-back direction in a view along the up-down direction means the following situation. When the first member and the second member are viewed in the up-down direction, both the first member and the second member are on an arbitrary line indicating the front-back direction. In this case, when the first member and the second member are viewed in the left-right direction, which is different from the up-down direction, either one of the first member and the second member may not be arranged on the arbitrary line indicating the front-back direction. Further, the first member and the second member may be in contact with each other. The first member and the second member may be out of contact with each other. A third member may be positioned between the first member and the second member. This definition applies to other directions as well as the front-back direction.

In the present specification, a statement that a first member is positioned farther in the forward direction than a second member means the following situation. The first member is positioned farther in the forward direction than a plane that passes a front edge of the second member and is perpendicular to the front-back direction. The first member and the second member may or may not be arranged in the front-back direction. This definition applies to other directions as well as the front-back direction.

In the present specification, a statement that a first member is positioned in front of a second member means the following situation. At least a part of the first member is positioned in a range that the second member passes during a translation thereof in the forward direction. Accordingly, the first member may be positioned within the range that the second member passes during a translation thereof in the forward direction, or may protrude from the range that the second member passes during a translation thereof in the forward direction. In this case, the first member and the second member are arranged in the front-back direction. This definition applies to other directions as well as the front-back direction.

In the present specification, a statement that a first member is positioned in front of a second member in a view along the left-right direction means the following situation. The first member and the second member are arranged in the front-back direction in a view along the left-right direction, and the part of the first member facing the second member is positioned farther in the forward direction than the second member in a view along the left-right direction. According to this definition, three-dimensionally, the first member and the second member are not necessarily arranged in the front-back direction. This definition applies to other directions as well as the front-back direction.

In the present specification, unless otherwise noted, parts of a first member are defined as follows. A front part of the first member means the front half of the first member. A rear part of the first member means the rear half of the first member. A left part of the first member means the left half of the first member. A right part of the first member means the right half of the first member. An upper part of the first member means the upper half of the first member. A lower part of the first member means the lower half of the first member. An upper edge of the first member means the edge of the first member in the upward direction. A lower edge of the first member means the edge of the first member in the downward direction. A front edge of the first member means the edge of the first member in the forward direction. A rear edge of the first member means the edge of the first member in the backward direction. A right edge of the first member means the edge of the first member in the rightward direction. A left edge of the first member means the edge of the first member in the leftward direction. An upper end part of the first member means the upper edge and its vicinity of the first member. A lower end part of the first member means the lower edge and its vicinity of the first member. A front end part of the first member means the front edge and its vicinity of the first member. A rear end part of the first member means the rear edge and its vicinity of the first member. A right end part of the first member means the right edge and its vicinity of the first member. A left end part of the first member means the left edge and its vicinity of the first member. The first member is a component of the leaning vehicle 1a.

As shown in FIG. 1B, the leaning vehicle 1a includes a vehicle body 2, a front wheel 3, a rear wheel 4, and a steering mechanism 7. The vehicle body 2 includes a vehicle body frame 21, a vehicle body cover 22, a seat 24, a power unit 25, and a swing arm 26.

The vehicle body frame 21 leans in the leftward direction L when the leaning vehicle 1a is turning left. The vehicle body frame 21 leans in the rightward direction R when the leaning vehicle 1a is turning right. In FIG. 1B, the vehicle body frame 21 is indicated by bold lines. However, the vehicle body frame 21 is covered by the vehicle body cover 22, and therefore, under ordinary conditions, the vehicle body frame 21 cannot be seen in FIG. 1B.

The vehicle body frame 21 includes a head pipe 211, a main frame 212, and a seat rail 213. The head pipe 211 is positioned in the front part of the leaning vehicle 1a. The front part of the leaning vehicle 1a is a part thereof that is positioned in front of the front edge of the seat 24 in the forward direction f. The rear part of the leaning vehicle 1a is a part thereof that is positioned behind the front edge of the seat 24 in the backward direction b. In a view in the leftward direction l or the rightward direction r, the head pipe 211 is inclined from the up-down direction ud such that the upper end part of the head pipe 211 is positioned behind the lower end part of the head pipe 211 in the backward direction b.

In a view in the rightward direction r, the main frame 212 is positioned farther in the backward direction b than the head pipe 211. The seat rail 213 linearly extends from the main frame 212 to a backward and upward direction b, u.

In a view in the rightward direction r, the swing arm 26 extends from the lower and rear part of the main frame 212 to the backward direction b. The swing arm 26 is supported by the main frame 212 in such a manner as to be capable of rotating on the front end part of the swing arm 26. Thereby, the rear end part of the swing arm 26 is movable up and down.

The vehicle body cover 22 covers the vehicle body frame 21. The vehicle body cover 22 also covers some part of the power unit 25.

The seat 24 is to be sat on by a rider. The seat 24 is supported by the seat rail 213. The power unit 25 includes a power source, such as an engine, an electric motor or the like, and a power transmission system, such as a transmission device or the like. The power unit 25 is supported by the main frame 212.

The steering mechanism 7 is arranged around the head pipe 211. The steering mechanism 7 is configured to steer the front wheel 3 in accordance with the rider's manipulation. As shown in FIG. 2, the steering mechanism 7 includes a handlebar 60, a steering shaft 62, a front fork 64, an upper bracket 66, and an under bracket 68. The handlebar 60 is to be manipulated by the rider for steering of the front wheel 3. The handlebar 60 is supported by the vehicle body frame 21 in a rotatable manner. The steering shaft 62 is supported by the vehicle body frame 21 in a rotatable manner on its central axis in accordance with the rider's manipulation of the handlebar 60. More specifically, the upper bracket 66 and the under bracket 68 are, as shown in FIG. 2, plate-like members extending along the left-right direction. The upper bracket 66 is positioned farther in the upward direction u than the head pipe 211. The under bracket 68 is positioned farther in the downward direction d than the head pipe 211. The steering shaft 62 is inserted in the head pipe 211 and thereby is supported by the head pipe 211 in a rotatable manner. Further, the steering shaft 62 is fixed to the upper bracket 66 and the under bracket 68. The handlebar 60 is fixed to the upper bracket 66.

The front fork 64 is fixed to the upper bracket 66 and the under bracket 68. Specifically, as shown in FIG. 2, the front fork 64 includes a left shock absorber 64L and a right shock absorber 64R. The left shock absorber 64L extends from the upper bracket 66 and the under bracket 68 to the downward direction d. The left shock absorber 64L is positioned to the left (l) of the center of the vehicle body frame 21 in an upright posture with respect to the left-right direction lr. The right shock absorber 64R extends from the upper bracket 66 and the under bracket 68 in the downward direction d. The right shock absorber 64R is positioned to the right (r) of the center of the vehicle body frame 21 in an upright posture with respect to the left-right direction lr. Accordingly, when the rider turns the handlebar 60, the steering shaft 62, the front fork 64, the upper bracket 66 and the under bracket 68 integrally rotated around the central axis of the steering shaft 62 in a body.

The left shock absorber 64L and the right shock absorber 64R are what are called telescopic shock absorbers. The left shock absorber 64L and the right shock absorber 64R each, for example, include a combination of a damper and a spring. The left shock absorber 64L and the right shock absorber 64R expand and contract along the up-down direction ud and thereby absorb displacements of the front wheel 3, which will be described later, along the up-down direction ud.

The front wheel 3 is a steerable wheel of the leaning vehicle 1a. The front wheel 3 is positioned in the front part of the leaning vehicle 1a. The front wheel 3 is supported by the lower end part of the front fork 64 in a rotatable manner around an axle. Thus, the front wheel 3 is supported by the vehicle body frame 21 via the steering mechanism 7. Accordingly, the rider can steer the front wheel 3 by manipulating the handlebar 60.

The rear wheel 4 is a driving wheel of the leaning vehicle 1a. The rear wheel 4 is rotated by a driving force generated by the power unit 25. The rear wheel 4 is positioned in the rear part of the leaning vehicle 1a. The rear wheel 4 is supported by the lower end part of the swing arm 26 in a rotatable manner around an axle.

[Steering Motion]

Figure 3:
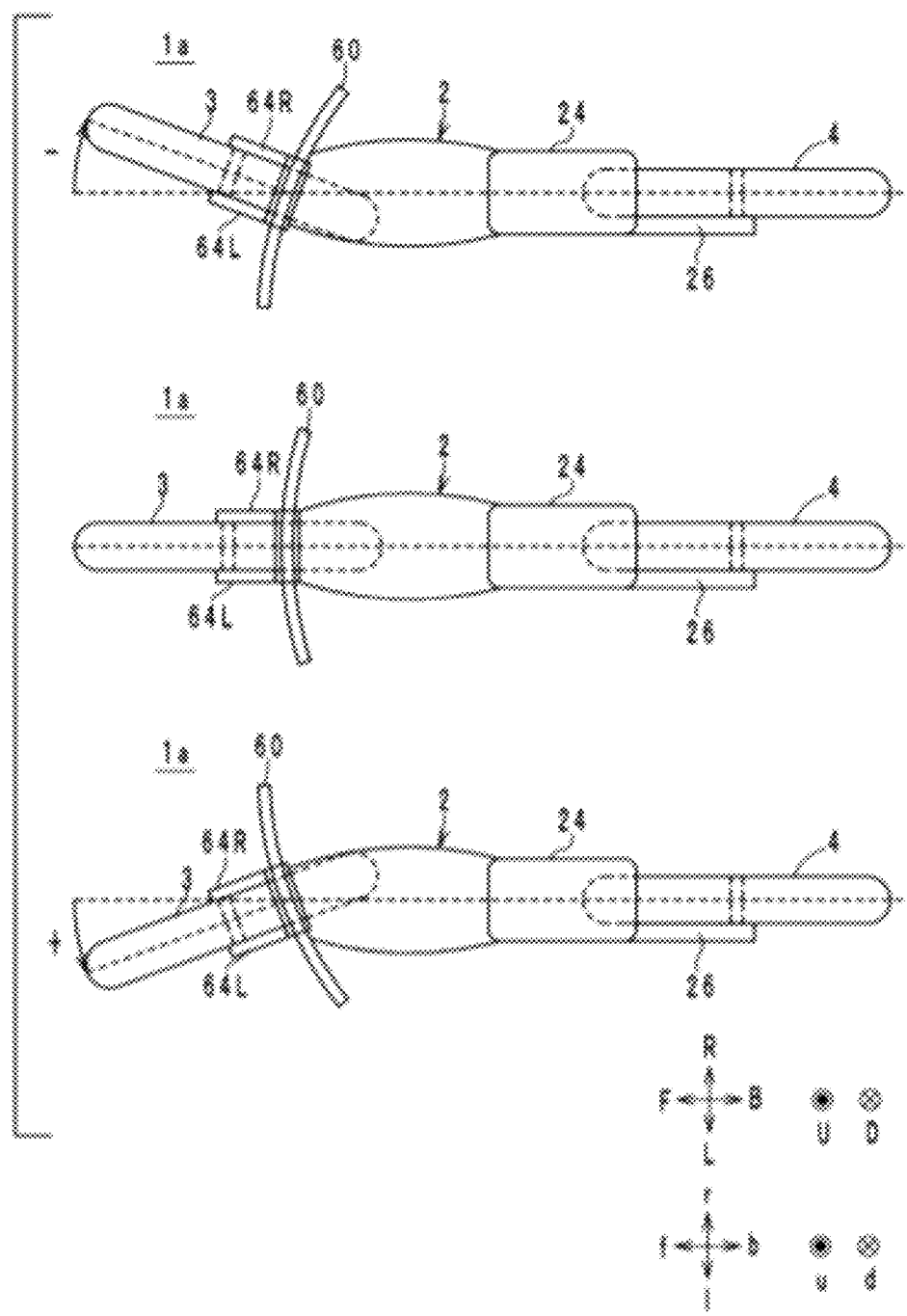
FIG. 3 is a schematic looking-to-the-down (D) view of the leaning vehicle 1*a*.

Next, steering motions of the leaning vehicle 1a are described with reference to the drawings. FIG. 3 is a schematic looking-to-the-down (D) view of the leaning vehicle 1a. FIG. 3 shows a state wherein the front wheel 3 is steered in the leftward direction L, a state wherein the front wheel 3 is not steered, and a state wherein the front wheel 3 is steered in the rightward direction R. As indicated in FIG. 3, the direction in which the handlebar 60 is turned counterclockwise in a view in the downward direction d is defined as a positive direction. The direction in which the handlebar 60 is turned clockwise in a view in the downward direction d is defined as a negative direction.

As shown in FIG. 3, in a view in the downward direction D, the front wheel 3 is turned counterclockwise when the rider turns the handlebar 60 counterclockwise (in the positive direction). Then, the front wheel 3 is steered in the leftward direction L (steered leftward).

As shown in FIG. 3, in a view in the downward direction D, the front wheel 3 is turned clockwise when the rider turns the handlebar 60 clockwise (in the negative direction). Then, the front wheel 3 is steered in the rightward direction R (steered rightward).

[Leaning Motion]

Figure 4:
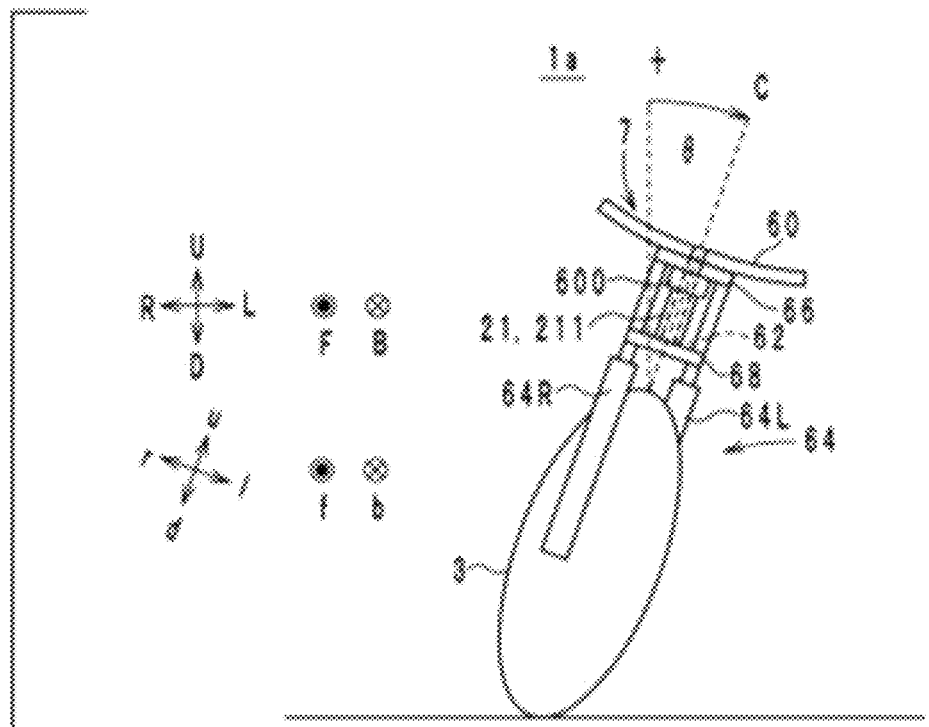
FIG. 4 is a schematic looking-to-the-back (B) view of the leaning vehicle 1*a*.

Next, leaning motions of the leaning vehicle 1a are described with reference to the drawings. FIG. 4 is a schematic looking-to-the-back (B) view of the leaning vehicle 1a. FIG. 4 shows a state wherein the vehicle body frame 21 leans in the leftward direction L and a state wherein the vehicle body frame 21 leans in the rightward direction R. FIG. 4 shows that the front wheel 3 is steered leftward by self-steering when the vehicle body frame 21 leans in the leftward direction L. FIG. 4 shows that the front wheel 3 is steered rightward by self-steering when the vehicle body frame 21 leans in the rightward direction R.

The vehicle body frame 21 leans in the leftward direction L or the rightward direction R by rotating around a roll axis Ax. The roll axis Ax is an axis extending along the front-back direction FB. More specifically, as shown in FIG. 1B, the roll axis Ax is a straight line that passes the contact point between the rear wheel 4 and the ground and is perpendicular to the steering shaft 62 when the vehicle body frame 21 is in an upright posture. In a view in the backward direction d, the roll axis Ax is in the center of the vehicle body frame 21 in an upright posture with respect to the left-right direction lr.

As the vehicle body frame 21 is rotating around the roll axis Ax, the rotation angle of the vehicle body frame 21 around the roll axis Ax changes, and the rotation angle of the vehicle body frame 21 around the roll axis Ax is referred to as a roll angle θ. In the following paragraphs, as shown in FIG. 2, the straight line that passes the center of the vehicle body frame 21 in an upright posture with respect to the left-right direction lr and extends along the up-down direction ud is defined as a center line C. As shown in FIG. 4, when the vehicle body frame 21 leans in the leftward direction L or the rightward direction R, the center line C leans in the leftward direction L or the rightward direction R together with the vehicle body frame 21. The roll angle θ is an angle formed between the vertical axis and the center line C. The vertical axis is an axis parallel to the up-down direction UD. The roll angle θ may be an angle formed between a line normal to the road surface and the center line C. The definition of the roll axis Ax is not limited to the above definition, and any other definition may be applicable.

Further, as shown in FIG. 4, when the vehicle body frame 21 leans in the leftward direction L, the direction of the lean is referred to as a positive direction of the roll angle θ. In other words, the clockwise direction around the roll axis Ax in a view in the backward direction B is defined as a positive direction of the roll angle θ. When the vehicle body frame 21 leans in the rightward direction R, the direction of the lean is referred to as a negative direction of the roll angle θ. In other words, the counterclockwise direction around the roll axis Ax in a view in the backward direction B is defined as a negative direction of the roll angle θ. The roll angle θ changes within a range of −90° to 90°.

As shown in FIG. 4, in a view in the backward direction B, the vehicle body frame 21 rotates clockwise around the roll axis Ax and leans in the leftward direction L. In this case, the roll angle θ is a positive value. Also, the front wheel 3 is steered leftward by self-steering. Then, the leaning vehicle 1a turns in the leftward direction L.

As shown in FIG. 4, in a view in the backward direction B, the vehicle body frame 21 rotates counterclockwise around the roll axis Ax and leans in the rightward direction R. Also, the front wheel 3 is steered rightward by self-steering. In this case, the roll angle θ is a negative value. The leaning vehicle 1a turns in the rightward direction R.

[Leaning-Vehicle-Steering-Actuator Controller]

Figure 5:
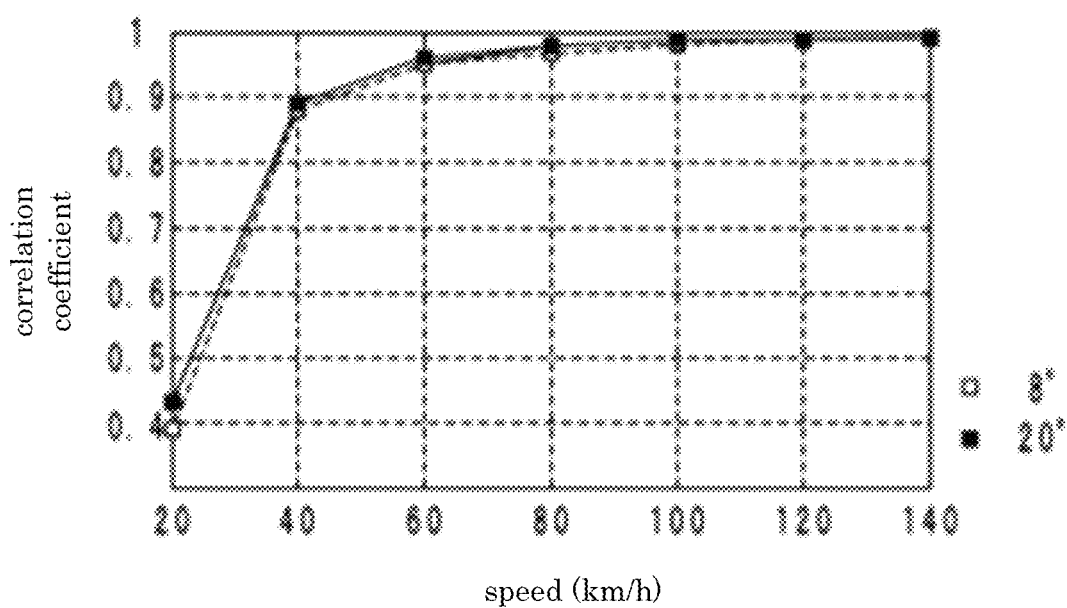
FIG. 5 is a graph showing the relationship between correlation coefficient and speed of a first test vehicle.
Figure 6:
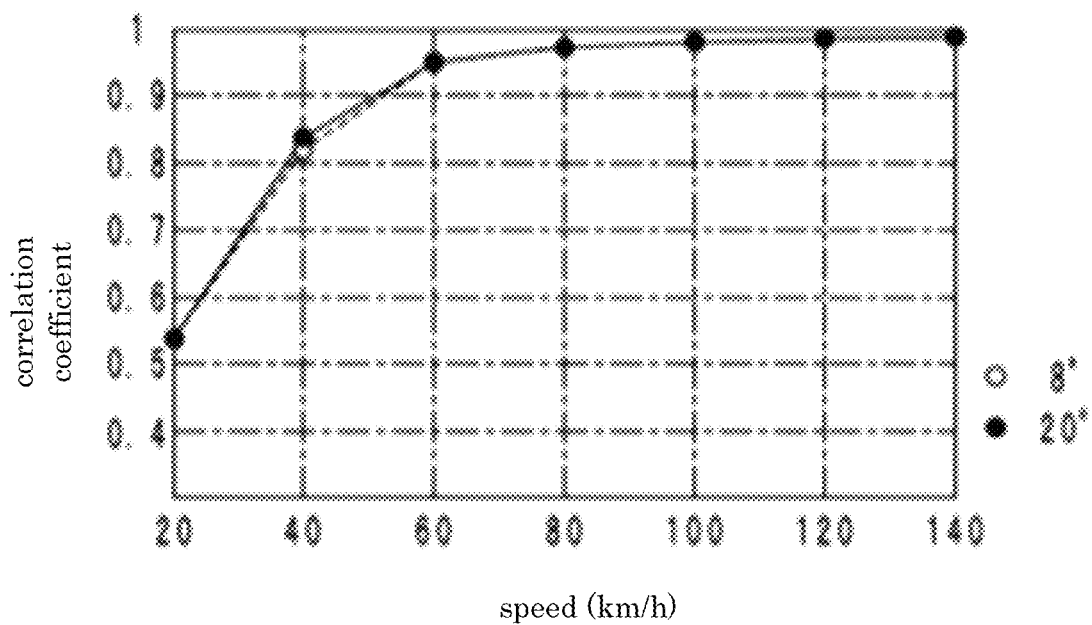
FIG. 6 is a graph showing the relationship between correlation coefficient and speed of a second test vehicle.
Figure 7:
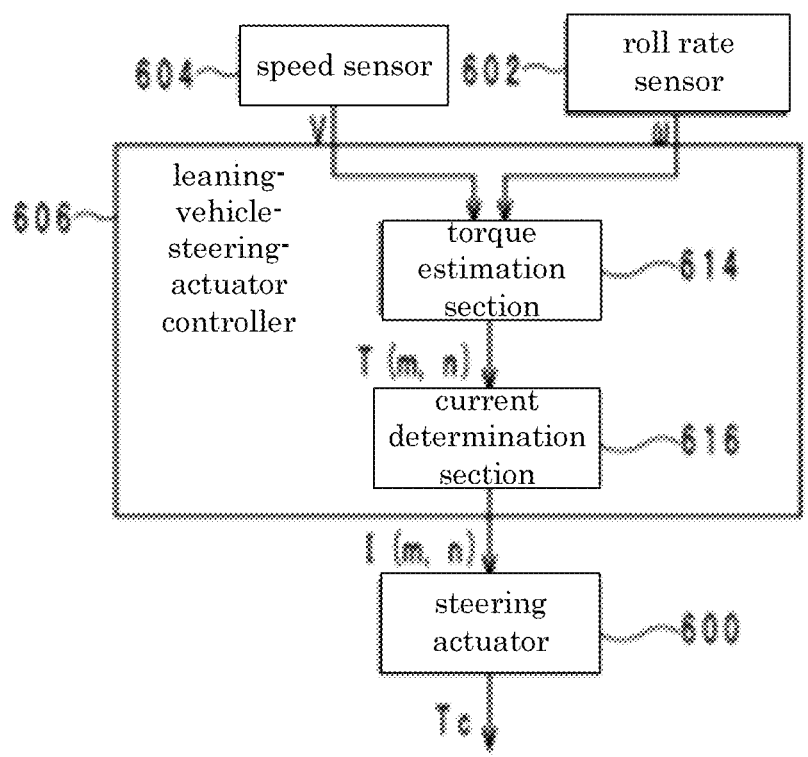
FIG. 7 is a block diagram of a leaning-vehicle-steering-actuator controller 606.

Next, the leaning-vehicle-steering-actuator controller 606 of the leaning vehicle 1a is described with reference to the drawings. FIG. 5 is a graph showing the relationship between correlation coefficient and speed of a first test vehicle. FIG. 6 is a graph showing the relationship between correlation coefficient and speed of a second test vehicle. The vertical axis indicates the correlation coefficient. The horizontal axis indicates the speed of the vehicle. FIG. 7 is a block diagram of the leaning-vehicle-steering-actuator controller 606.

In order to find out the correlation between the roll rate ω and the steering torque T, the present inventors conducted the following experiment. The steering torque T is a torque that is generated by the rider's manipulation of the handlebar 60 and acts on the steering shaft 62. More specifically, the steering torque T is a torque that is inputted to the steering shaft 62 by the rider's manipulation of the handlebar 60 when the roll angle θ of the vehicle body frame 21 of the leaning vehicle 1a running at a speed V is changing at a roll rate ω. The steering torque T is a moment that acts around the steering shaft 62. When the steering torque T acts in the counterclockwise direction in a view in the downward direction d, the steering shaft 62 is rotated counterclockwise (in the positive direction) by the steering torque T. When the steering torque T acts in the clockwise direction in a view in the downward direction d, the steering shaft 62 is rotated clockwise (in the negative direction) by the steering torque T.

The present inventors prepared a first test vehicle and a second test vehicle. The first test vehicle was a sport-type three-wheeled motorcycle. The sport-type three-wheeled motorcycle included two front wheels and one rear wheel. The second test vehicle was a sport-type two-wheeled motorcycle. The present inventors operated the first test vehicle and the second test vehicle to run, and measured the roll rate ω and the steering torque T with the speed set to seven values and with the roll angle θ set to two values. More specifically, the present inventors changed the steering torque T while operating each of the first test vehicle and the second test vehicle to run at seven different speeds V. The present inventors changed the steering torque T by manipulating the handlebar while the vehicle is running. The present inventors measured the steering torque T in relation to time and measured the roll rate ω in relation to time. A torque sensor was used for the measurement of the steering torque T. A roll rate sensor was used for the measurement of the roll rate. Then, the correlation coefficient between the roll rate ω and the steering torque T was calculated. The seven values of the speed V were 20 km/h, 40 km/h, 60 km/h, 80 km/h, 100 km/h, 120 km/h, and 140 km/h. The two values of the roll angle θ were 8° and 20°. The correlation coefficient was the Pearson product-moment correlation coefficient.

FIGS. 5 and 6 show that there was a high correlation between the roll angle ω and the steering torque T. Also, the greater the speed V was, the higher the correlation coefficient between the roll angle ω and the steering torque T was. Especially when the speed was 40 km/h or higher, the correlation coefficient was 0.8 or more, and when the speed was 60 km/h or higher, the correlation coefficient was 0.9 or more. Thus, the present inventors confirmed by the experiment that there is a high correlation between the roll angle ω and the steering torque T. Therefore, the present inventors conceived of an idea that the steering torque T can be estimated based on the roll angle ω. The present inventors also conceived of an idea that the rider's manipulation of the handlebar 60 can be assisted based on the estimated steering torque T. Then, the leaning vehicle 1a includes the leaning-vehicle-steering-actuator controller 606 as described below.

As shown in FIG. 1B, the leaning vehicle 1a further includes a steering actuator 600, a roll rate sensor 602 and a speed sensor 604 as well as the leaning-vehicle-steering-actuator controller 606.

The steering actuator 600 is supplied with electric power and outputs a supplementary steering torque Tc to cause the steering shaft 62 to rotate on its central axis. More specifically, as shown in FIG. 2, the steering actuator 600 is fixed to the upper end part of the head pipe 211. The steering actuator 600 is a combination of an electric motor and a gear. The electric motor generates a torque. The torque generated by the electric motor is outputted to the steering shaft 62 as a supplementary steering torque Tc (i.e., the second steering torque) via the gear.

The roll rate sensor 602 detects the roll rate ω that is the amount of change per unit time of the roll angle θ. When the vehicle body frame 21 leans in the leftward direction L, the direction of the lean is referred to as a positive direction of the roll rate ω. In other words, the clockwise direction around the roll axis Ax in a view in the backward direction B is defined as a positive direction of the roll rate ω. When the vehicle body frame 21 leans in the rightward direction R, the direction of the lean is referred to as a negative direction of the roll rate ω. In other words, the counterclockwise direction around the roll axis Ax in a view in the backward direction B is defined as a negative direction of the roll rate ω.

The speed sensor 604 detects the speed V of the leaning vehicle 1a. The speed V is a positive value when the leaning vehicle 1a is running forward.

The leaning-vehicle-steering-actuator controller 606 is, for example, an IC (integrated circuit) for control of the steering actuator 600. However, the leaning-vehicle-steering-actuator controller 606 does not need to be achieved by a single IC, and the leaning-vehicle-steering-actuator controller 606 may be a combination of one or more ICs, one or more electronic components and/or one or more circuit boards.

The steering actuator 600, the roll rate sensor 602 and the leaning-vehicle-steering-actuator controller 606 are combined in such a manner as not to be displaceable relative to one another. More specifically, for example, the roll rate sensor 602 and the leaning-vehicle-steering-actuator controller 606 are fixed in a case of the steering actuator 600. The means for fixing the roll rate sensor 602 and the leaning-vehicle-steering-actuator controller 606 to the steering actuator 600 may be a combination of a bolt and a nut, a screw, a snap-fit, an adhesive, an adhesive tape, welding, brazing, etc. The steering actuator 600 is to output a supplementary steering torque Tc to the steering shaft 62. Therefore, the steering actuator 600 is supported by the vehicle body frame 21 in such a manner as not to be displaceable relative to the vehicle body frame 21. In this structure, the roll rate sensor 602 and the leaning-vehicle-steering-actuator controller 606 are not displaceable relative to the steering actuator 600, and the steering actuator 600 is not displaceable relative to the vehicle body frame 21. In the present specification, when it is stated that a first member is supported by a second member in such a manner as not to be displaceable relative to the second member, it also means that there is no elastic member for impact absorption, such as a rubber mount or the like, between the first member and the second member. The roll rate sensor 602 is positioned on the center line C in a view in the backward direction B.

The description is now returned to the leaning-vehicle-steering-actuator controller 606. The leaning-vehicle-steering-actuator controller 606 obtains the roll rate ω from the roll rate sensor 602. Specifically, an electric signal representing the roll rate ω (which will hereinafter be referred to simply as roll rate ω) detected by the roll rate sensor 602 is inputted to the leaning-vehicle-steering-actuator controller 606.

The leaning-vehicle-steering-actuator controller 606 obtains the speed V from the speed sensor 604. Specifically, an electric signal representing the speed V (which will hereinafter be referred to simply as speed V) detected by the speed sensor 604 is inputted to the leaning-vehicle-steering-actuator controller 606.

The leaning-vehicle-steering-actuator controller 606 does not use a torque sensor that detects the steering torque T that is generated by the rider's manipulation and acts around the rotation axis of the handlebar 60 (central axis of the steering shaft 62), but uses the roll rate sensor 602. Then, the leaning-vehicle-steering-actuator controller 606 controls the steering actuator 600 not based on the steering torque T detected by the torque sensor as the steering torque generated by the rider's manipulation and acting around the steering shaft 62 of the handlebar 60 but based on the roll rate ω sent from the roll rate sensor 602. In the present embodiment, the leaning-vehicle-steering-actuator controller 606 uses neither a torque sensor that detects the steering torque T nor a roll sensor that detects the roll angle θ. The leaning-vehicle-steering-actuator controller 606 uses the roll rate sensor 602 and the speed sensor 604. Then, the leaning-vehicle-steering-actuator controller 606 controls the steering actuator 600 based on neither the steering torque T detected by a torque sensor nor the roll angle θ detected by a roll sensor. The leaning-vehicle-steering-actuator controller 606 controls the steering actuator 600 based on the roll rate ω sent from the roll rate sensor 602 and the speed V sent from the speed sensor 604. The statement that the leaning-vehicle-steering-actuator controller 606 uses neither a torque sensor nor a roll sensor means, for example, that the leaning-vehicle-steering-actuator controller 606 uses neither a signal sent from a torque sensor nor a signal sent from a roll sensor for control. The statement that the leaning-vehicle-steering-actuator controller 606 uses the roll rate sensor 602 and the speed sensor 604 means, for example, that the leaning-vehicle-steering-actuator controller 606 uses a signal sent from the roll rate sensor 602 and a signal sent from the speed sensor 604 for control.

In the present embodiment, the leaning-vehicle-steering-actuator controller 606 does not use a torque sensor that detects the torque that is generated by the rider's manipulation and acts around the rotation axis of the handlebar 60, but uses the roll rate sensor 602 and the speed sensor 604 that detects the speed of the leaning vehicle 1a. The leaning-vehicle-steering-actuator controller 606 estimates an estimated steering torque T(m, n) that is an estimated value of the steering torque T that is generated by the rider's manipulation and acts around the rotation axis of the handlebar 60, not based on the torque detected by the torque sensor as the steering torque T that is generated by the rider's manipulation and acts around the rotation axis of the handlebar 60 but based on the roll rate ω sent from the roll rate sensor 602 and the speed V sent from the speed sensor 604. Then, the leaning-vehicle-steering-actuator controller 606 controls the steering actuator 600 based on the estimated steering torque T(m, n).

The leaning-vehicle-steering-actuator controller 606 includes a torque estimation section 614 and a current determination section 616. The torque estimation section 614 determines an estimated steering torque T(m, n), which is an estimated value of the steering torque T, based on the speed V and the roll rate ω. The values m and n are integers. The estimated steering torque T(m, n) is a value of the steering torque T that is estimated to be inputted to the steering shaft 62 by the rider's manipulation of the handlebar 60 when the roll angle θ of the vehicle body frame 21 is changing at the roll rate ω while the leaning vehicle 1a is running at the speed V. The torque estimation section 614 stores an estimated steering torque determination table as shown by TABLE 1.

TABLE 1

| | | | | | | | ω(n)(deg/s) | | | | | | | |
|---|---|---|---|---|---|---|---|---|---|---|---|---|---|---|
| | | ... | ω(−5) | ω(−4) | ω(−3) | ω(−2) | ω(−1) | ω(0) = 0 | ω(1) | ω(2) | ω(3) | ω(4) | ω(5) | ... |
| V(m) (km/h) | V(1) | ... | T(1, −5) | T(1, −4) | T(1, −3) | T(1, −2) | T(1, −1) | T(1, 0) = 0 | T(1, 1) | T(1, 2) | T(1, 3) | T(1, 4) | T(1, 5) | ... |
| | V(2) | ... | T(2, −5) | T(2, −4) | T(2, −3) | T(2, −2) | T(2, −1) | T(2, 0) = 0 | T(2, 1) | T(2, 2) | T(2, 3) | T(2, 4) | T(2, 5) | ... |
| | V(3) | ... | T(3, −5) | T(3, −4) | T(3, −3) | T(3, −2) | T(3, −1) | T(3, 0) = 0 | T(3, 1) | T(3, 2) | T(3, 3) | T(3, 4) | T(3, 5) | ... |
| | V(4) | ... | T(4, −5) | T(4, −4) | T(4, −3) | T(4, −2) | T(4, −1) | T(4, 0) = 0 | T(4, 1) | T(4, 2) | T(4, 3) | T(4, 4) | T(4, 5) | ... |
| | V(5) | ... | T(5, −5) | T(5, −4) | T(5, −3) | T(5, −2) | T(5, −1) | T(5, 0) = 0 | T(5, 1) | T(5, 2) | T(5, 3) | T(5, 4) | T(5, 5) | ... |
| | ... | ... | ... | ... | ... | ... | ... | ... | ... | ... | ... | ... | ... | ... |

In the estimated steering torque determination table, estimated steering torque T(m, n) are stored in association with values of the speed V(m) and values of the roll rate ω(n). The values of the speed V(m) are greater than 0 km/h. The greater the value m is, the greater the speed V(m) is. Accordingly, V(m)<V(m+1) holds.

When the value n is positive, the roll rate ω(n) is a positive value. In this case, the greater the value n is, the greater the roll rate ω(n) is. On the other hand, when the value n is negative, the roll rate ω(n) is a negative value. In this case, the smaller the value n is, the smaller the roll rate ω(n) is (the greater the absolute value of the roll rate ω(n) is). Accordingly, ω(n)<ω(n+1) holds.

While the leaning vehicle 1a is running forward, when the rider turns the handlebar 60 clockwise (in the negative direction), the front wheel 3 is rotated at a roll rate ω(n) of a positive value. For example, while the vehicle body 21 is in an upright posture, when the rider turns the handlebar 60 clockwise (in the negative direction), the front wheel 3 is steered rightward. Then, the vehicle body frame 21 leans in the leftward direction L. On the other hand, while the leaning vehicle 1a is running forward, when the rider turns the handlebar counterclockwise (in the positive direction), the front wheel 3 is rotated at a roll rate ω(n) of a negative value. For example, while the vehicle body frame 21 is in an upright posture, when the rider turns the handlebar counterclockwise (in the positive direction), the front wheel 3 is steered leftward. Then, the vehicle body frame 21 leans in the rightward direction R. Thus, the rider performs countersteering to generate a roll rate ω(n). Therefore, the estimated steering torque T(m, n) has the following relationship with the values m and n.

When the value n is positive (when the roll rate ω(n) is a positive value), the estimated steering torque T(m, n) is a negative value. In this case, the estimated steering torque T(m, n) indicates a steering torque to cause the steering shaft 62 to rotate clockwise (in the negative direction) in a view in the downward direction d. In this case, the greater the value n is (the greater the roll rate ω(n) is), the smaller the estimated steering torque T(m, n) is (the greater the absolute value of the estimated steering torque T(m, n) is). Also, the greater the value m is (the greater the speed V(m) is), the smaller the estimated steering torque T(m, n) is (the greater the absolute value of the estimated steering torque T(m, n) is).

On the other hand, when the value n is negative (when the roll rate ω(n) is a negative value), the estimated steering torque T(m, n) is a positive value. In this case, the estimated steering torque T(m, n) indicates a steering torque to cause the steering shaft 62 to rotate counterclockwise (in the positive direction) in a view in the downward direction d. In this case, the smaller the value n is (the smaller the roll rate ω(n) is), the greater the estimated steering torque T(m, n) is. Also, the greater the value m is (the greater the speed V(m) is), the greater the estimated steering torque T(m, n) is.

The torque estimation section 614 identifies a speed V(m) that is closest to the speed V that the leaning-vehicle-steering-actuator controller 606 has obtained. Also, the torque estimation section 614 identifies a roll rate ω(n) that is closest to the roll rate ω that the leaning-vehicle-steering-actuator controller 606 has obtained. Then, the torque estimation section 614 determines an estimated steering torque T(m, n) in association with the speed V(m) and the roll rate ω(n) with reference to TABLE 1.

The current determination section 616 controls the steering actuator 600 based on the estimated steering torque T(m, n) determined by the torque estimation section 614. Specifically, the current determination section 616 determines a control current value I(m, n) to be outputted to the steering actuator 600, based on the estimated steering torque T(m, n). For this purpose, the current determination section 616 stores a control current determination table as shown by TABLE 2.

In the control current determination table, values of the estimated steering torque T(m, n) and values of the control current I(m, n) are stored in association with each other. The control current I(m, n) is a current that the steering actuator 600 requires to output a supplementary steering torque Tc corresponding to the assist rate (for example, 20%) of the estimated steering torque T(m, n) to the steering shaft 62. The steering actuator 600 outputs a supplementary steering torque Tc corresponding to 20% of the estimated steering torque T(m, n) to the steering shaft 62. Accordingly, the rider only needs to manipulate the handlebar 60 to apply 80% of the estimated steering torque T(m, n) to the steering shaft 62. In this way, the steering actuator 600 assists the rider's manipulation of the handlebar 60. The assist rate is an arbitrary value and may be a value other than 20%. In order to allow the rider to manipulate the handlebar 60 with less power, the assist rate should be more than 20%. In order to allow the rider to manipulate the handlebar 60 with more power, the assist rate should be less than 20%. The assist rate may be a negative value. In this case, the steering actuator 600 outputs a supplementary steering torque Tc to resist the rider's manipulation of the handlebar 60. Then, the steering actuator 600 functions as a steering damper.

When the value n is positive, the control current I(m, n) is a negative value. The greater the value n is, the smaller the control current I(m, n) is (the greater the absolute value of the control current I(m, n) is). Also, the greater the value m is, the smaller the control current I(m, n) is (the greater the absolute value of the control current I(m, n) is).

On the other hand, when the value n is negative, the control current I(m, n) is a positive value. The smaller the value n is, the greater the control current I(m, n) is. Also, the greater the value m is, the greater the control current I(m, n) is.

The steering actuator 600 outputs a supplementary steering torque Tc to the steering shaft 62 by the control current I(m, n) outputted from the current determination section 616. However, the current determination section 616 does not need to output the control current I(m, n) to the steering actuator 600 directly. The control current I(m, n) may be supplied to the steering actuator 600 from a power source that is provided separately from the leaning-vehicle-steering-actuator controller 606.

When receiving a negative control current value I(m, n), the steering actuator 600 outputs a supplementary steering torque Tc to rotate the steering shaft 62 clockwise (in the negative direction). In this case, the greater the absolute value of the control current I(m, n) is, the greater the absolute value of the supplementary steering torque Tc is. Then, in a view in the backward direction B, the vehicle body frame 21 rotates clockwise (in the positive direction) around the roll axis Ax at the roll rate ω.

TABLE 2

| ... | T(1, −5) | T(1, −4) | T(1, −3) | T(1, −2) | T(1, −1) | T(1, 0) = 0 | T(1, 1) | T(1, 2) | T(1, 3) | T(1, 4) | T(1, 5) | ... |
|---|---|---|---|---|---|---|---|---|---|---|---|---|
| | I(1, −5) | I(1, −4) | I(1, −3) | I(1, −2) | I(1, −1) | I(1, 0) = 0 | I(1, 1) | I(1, 2) | I(1, 3) | I(1, 4) | I(1, 5) | |
| ... | T(2, −5) | T(2, −4) | T(2, −3) | T(2, −2) | T(2, −1) | T(2, 0) = 0 | T(2, 1) | T(2, 2) | T(2, 3) | T(2, 4) | T(2, 5) | ... |
| | I(2, −5) | I(2, −4) | I(2, −3) | I(2, −2) | I(2, −1) | I(2, 0) = 0 | I(2, 1) | I(2, 2) | I(2, 3) | I(2, 4) | I(2, 5) | |
| ... | T(3, −5) | T(3, −4) | T(3, −3) | T(3, −2) | T(3, −1) | T(3, 0) = 0 | T(3, 1) | T(3, 2) | T(3, 3) | T(3, 4) | T(3, 5) | ... |
| | I(3, −5) | I(3, −4) | I(3, −3) | I(3, −2) | I(3, −1) | I(3, 0) = 0 | I(3, 1) | I(3, 2) | I(3, 3) | I(3, 4) | I(3, 5) | |
| ... | T(4, −5) | T(4, −4) | T(4, −3) | T(4, −2) | T(4, −1) | T(4, 0) = 0 | T(4, 1) | T(4, 2) | T(4, 3) | T(4, 4) | T(4, 5) | ... |
| | I(4, −5) | I(4, −4) | I(4, −3) | I(4, −2) | I(4, −1) | I(4, 0) = 0 | I(4, 1) | I(4, 2) | I(4, 3) | I(4, 4) | I(4, 5) | |
| ... | T(5, −5) | T(5, −4) | T(5, −3) | T(5, −2) | T(5, −1) | T(5, 0) = 0 | T(5, 1) | T(5, 2) | T(5, 3) | T(5, 4) | T(5, 5) | ... |
| | I(5, −5) | I(5, −4) | I(5, −3) | I(5, −2) | I(5, −1) | I(5, 0) = 0 | I(5, 1) | I(5, 2) | I(5, 3) | I(5, 4) | I(5, 5) | |
| ... | ... | ... | ... | ... | ... | ... | ... | ... | ... | ... | ... | ... |

On the other hand, when receiving a positive control current value I(m, n), the steering actuator 600 outputs a supplementary steering torque Tc to rotate the steering shaft 62 counterclockwise (in the positive direction). In this case, the greater the absolute value of the control current I(m, n) is, the greater the absolute value of the supplementary steering torque Tc is. Then, in a view in the backward direction B, the vehicle body frame 21 rotates counterclockwise (in the negative direction) around the roll axis Ax at the roll rate ω.

As described above, the leaning-vehicle-steering-actuator controller 606 controls the steering actuator 600 to output a supplementary steering torque Tc, based on the speed V and the roll rate ω. Then, the steering shaft 62 rotates, and the vehicle body frame 21 rotates clockwise or counterclockwise around the roll axis Ax in a view in the backward direction B. Accordingly, the posture of the vehicle body frame 21 changes. In this way, the leaning-vehicle-steering-actuator controller 606 controls the posture of the vehicle body frame 21 based on the speed V and the roll rate ω.

Figure 8:
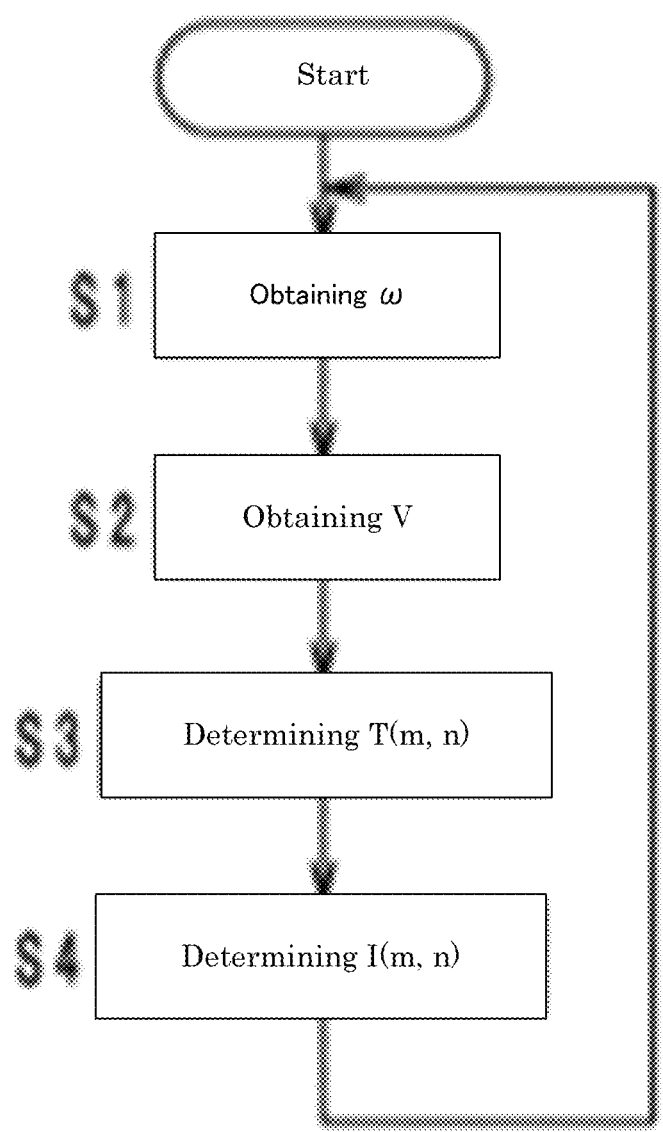
FIG. 8 is a flowchart showing operations carried out by the leaning-vehicle-steering-actuator controller 606.

Next, operations of the leaning-vehicle-steering-actuator controller 606 will be described with reference to the drawings. FIG. 8 is a flowchart showing operations performed by the leaning-vehicle-steering-actuator controller 606. The leaning-vehicle-steering-actuator controller 606 performs a process that will be described below by running a software program stored in a storage device (not shown).

The process is started when an ignition source of the leaning vehicle 1*a* is turned on. As long as the ignition source is on, the roll rate sensor 602 keeps outputting the roll rate ω to the leaning-vehicle-steering-actuator controller 606. Also, the speed sensor 604 keeps outputting the speed V to the leaning-vehicle-steering-actuator controller 606.

The torque estimation section 614 obtains the roll rate ω from the roll rate sensor 602 (step S1). Further, the torque estimation section 614 obtains the speed V from the speed sensor 604 (step S2).

Next, the torque estimation section 614 identifies one of the roll rate value listed in the estimation steering torque table as shown by TABLE 1 as a roll rate ω(n) closest to the roll rate ω. Further, the torque estimation section 614 identifies one of the speed values listed in the estimation steering torque table as shown by TABLE 1 as a speed V(m) closest to the speed V. Then, the torque estimation section 614 determines an estimated steering torque T(m, n) in association with the roll rate ω(n) and the speed V(m) with reference to the estimated steering torque determination table as shown by TABLE 1 (step S3).

Next, the current determination section 616 determines a control current value I(m, n) corresponding to the estimated steering torque T(m, n) determined by the torque estimation section 614 by using the control current determination table as shown by TABLE 2 (step S4). The current determination section 616 outputs the control current value I(m, n) to the steering actuator 600. The steering actuator 600 outputs a supplementary steering torque Tc corresponding to the control current value I(m, n) to the steering shaft 62. Thereafter, the process returns to step S1. The process from step S1 to S4 is repeated until the ignition source is switched from on to off.

[Effects]

The leaning-vehicle-steering-actuator controller 606 can control the steering actuator 600 in an unconventional manner. More specifically, in order to change the roll angle θ of the vehicle body frame 21, the rider manipulates the handlebar 60 to generate a steering torque T acting around the rotation axis of the handlebar 60. Thereby, the roll angle θ of the vehicle body frame 21 is changed, and the posture of the vehicle body frame 21 is changed. In this way, the rider can control the posture of the vehicle body frame 21 by using the steering torque T acting on the steering shaft 62 as an input parameter.

The greater the absolute value of the steering torque T is, the greater the absolute value of the roll rate ω that represents the change of the roll angle θ of the vehicle body frame 21 is. The smaller the absolute value of the steering torque T is, the smaller the absolute value of the roll rate ω of the vehicle body frame 21 is. Thus, there is a correlation between the steering torque T and the roll rate ω. Therefore, instead of the steering torque T, the roll rate ω can be used as an input parameter for posture control of the vehicle body frame 21. Then, the leaning-vehicle-steering-actuator controller 606 controls the steering actuator 600 based on the roll rate ω.

For the following reason, the leaning-vehicle-steering-actuator controller 606 controls the steering actuator 600 without using a torque sensor that detects the steering torque T, and not based on the steering torque T detected by the torque sensor. Since there is a correlation between the steering torque T and the roll rate ω, the steering torque T does not need to be detected if the roll rate ω is detected. Thus, the leaning-vehicle-steering-actuator controller 606 can control the steering actuator 600 not based on the steering torque T, which is conventionally used for control of the steering actuator 600.

For the reason above, the leaning-vehicle-steering-actuator controller 606 uses not a torque sensor that detects the steering torque T but the roll rate sensor 602, and controls the steering actuator 600 not based on the steering torque T detected by the torque sensor but based on the roll rate ω sent from the roll rate sensor 602. As a result, the leaning-vehicle-steering-actuator controller 606 can control the steering actuator 600 in an unconventional manner.

The leaning-vehicle-steering-actuator controller 606 does not use the steering torque T for control of the steering actuator 600. Therefore, the leaning vehicle 1 having the leaning-vehicle-steering-actuator controller 606 does not need to include a torque sensor that detects the steering torque T. However, the leaning vehicle 1 having the leaning-vehicle-steering-actuator controller 606 may include a torque sensor that detects the steering torque T.

The leaning-vehicle-steering-actuator controller 606 can control the steering actuator 600 in an unconventional manner also for another reason as described below. More specifically, the present inventors conducted studies about the correlation between the steering torque T and the roll angle θ. Then, the present inventors found that in a transient state where a roll rate ω is generated, the correlation between the steering torque T and the roll angle θ is not so high as the correlation between the steering torque T and the roll rate ω. Therefore, the leaning-vehicle-steering-actuator controller 606 uses the roll rate sensor 602 with using neither a torque sensor that detects the steering torque T nor a roll sensor that detects the roll angle θ, and the leaning-vehicle-steering-actuator controller 606 controls the steering actuator 600 based on the roll rate ω sent from the roll rate sensor 602, neither the steering torque T detected by the torque sensor nor the roll angle θ detected by the roll sensor. Thus, the leaning-vehicle-steering-actuator controller 606 controls the steering actuator 600 in an unconventional manner.

The leaning-vehicle-steering-actuator controller 606 can control the steering actuator 600 in an unconventional manner also for still another reason as described below. There is a correlation as described below between the posture change of the vehicle body frame 21 and the speed V of the leaning vehicle 1*a*. As the absolute value of the speed V of the leaning vehicle 1*a* is increasing, the absolute value of the rotation speed of the front wheel 3 becomes greater, and the absolute value of the angular momentum of the front wheel 3 becomes greater. Then, an external force of a greater absolute value is needed to change the angular momentum of the front wheel 3, and it becomes harder to change the posture of the vehicle body frame 21. On the other hand, as the absolute value of the speed V of the leaning vehicle 1*a* is decreasing, the absolute value of rotation speed of the front wheel 3 becomes smaller, and the absolute value of the angular momentum of the front wheel 3 becomes smaller. Then, an external force of a smaller absolute value is needed to change the angular momentum of the front wheel 3, and it becomes easier to change the posture of the vehicle body frame 21. Therefore, the leaning-vehicle-steering-actuator controller 606 controls the steering actuator 600 based on the speed V of the leaning vehicle 1*a*. Thus, the leaning-vehicle-steering-actuator controller 606 controls the steering actuator 600 in an unconventional manner.

The leaning-vehicle-steering-actuator controller 606 can control the steering actuator 600 in an unconventional manner also for still another reason as described below. There is a correlation as described below between the posture change of the vehicle body frame 21 and the speed V of the leaning vehicle 1*a*. As the absolute value of the speed V of the leaning vehicle 1*a* is increasing, the absolute value of the rotation speed of the front wheel 3 becomes greater, and the absolute value of the angular momentum of the front wheel 3 becomes greater. Then, an external force of a greater absolute value is needed to change the angular momentum of the front wheel 3, and it becomes harder to change the posture of the vehicle body frame 21. On the other hand, as the absolute value of the speed V of the leaning vehicle 1*a* is decreasing, the absolute value of the rotation speed of the front vehicle 3 becomes smaller, and the absolute value of the angular momentum of the front wheel 3 becomes smaller. Then, an external force of a smaller absolute value is needed to change the angular momentum of the front wheel 3, and it becomes easier to change the posture of the vehicle body frame 21. Therefore, the leaning-vehicle-steering-actuator controller 606 controls the steering actuator 600 by using the roll rate sensor 602 and the speed sensor 604 that detects the speed V of the leaning vehicle 1*a* without using a torque sensor that detects the steering torque. The leaning-vehicle-steering-actuator controller 606 determines an estimated steering torque T(m, n), which is an estimated value of the steering torque T, not based on the steering torque T detected by the torque sensor but based on the roll rate ω sent from the roll rate sensor 602 and the speed V sent from the speed sensor 604, and the leaning-vehicle-steering-actuator controller 606 controls the steering actuator 600 based on the estimated steering torque T(m, n). Thus, the leaning-vehicle-steering-actuator controller 606 controls the steering actuator 600 in an unconventional manner.

Also, the leaning-vehicle-steering-actuator controller 606 does not require a torque sensor of high rigidity. More specifically, the steering torque T is a great torque, and for detection of the steering torque T, a torque sensor of high rigidity is required. However, the leaning-vehicle-steering-actuator controller 606 does not use the steering torque T for control of the steering actuator 600. Therefore, the leaning vehicle 1*a* does not need to include a torque sensor of high rigidity. However, this does not exclude providing a torque sensor for the leaning vehicle 1*a*.

The roll rate sensor 602 of the leaning vehicle 1*a* is supported by the vehicle body frame 21 in such a manner as not to be displaceable relative to the vehicle body frame 21. This inhibits a great delay of a posture change of the roll rate sensor 602 from a posture change of the vehicle body frame 21. Therefore, the detection accuracy of the roll rate ω by the roll rate sensor 602 can be improved.

Also, the roll rate sensor 602 is positioned on the center line C in a view in the backward direction B, and therefore, the detection accuracy of the roll rate ω by the roll rate sensor 602 can be improved.

Second Embodiment

[Overall Structure]

Figure 9:
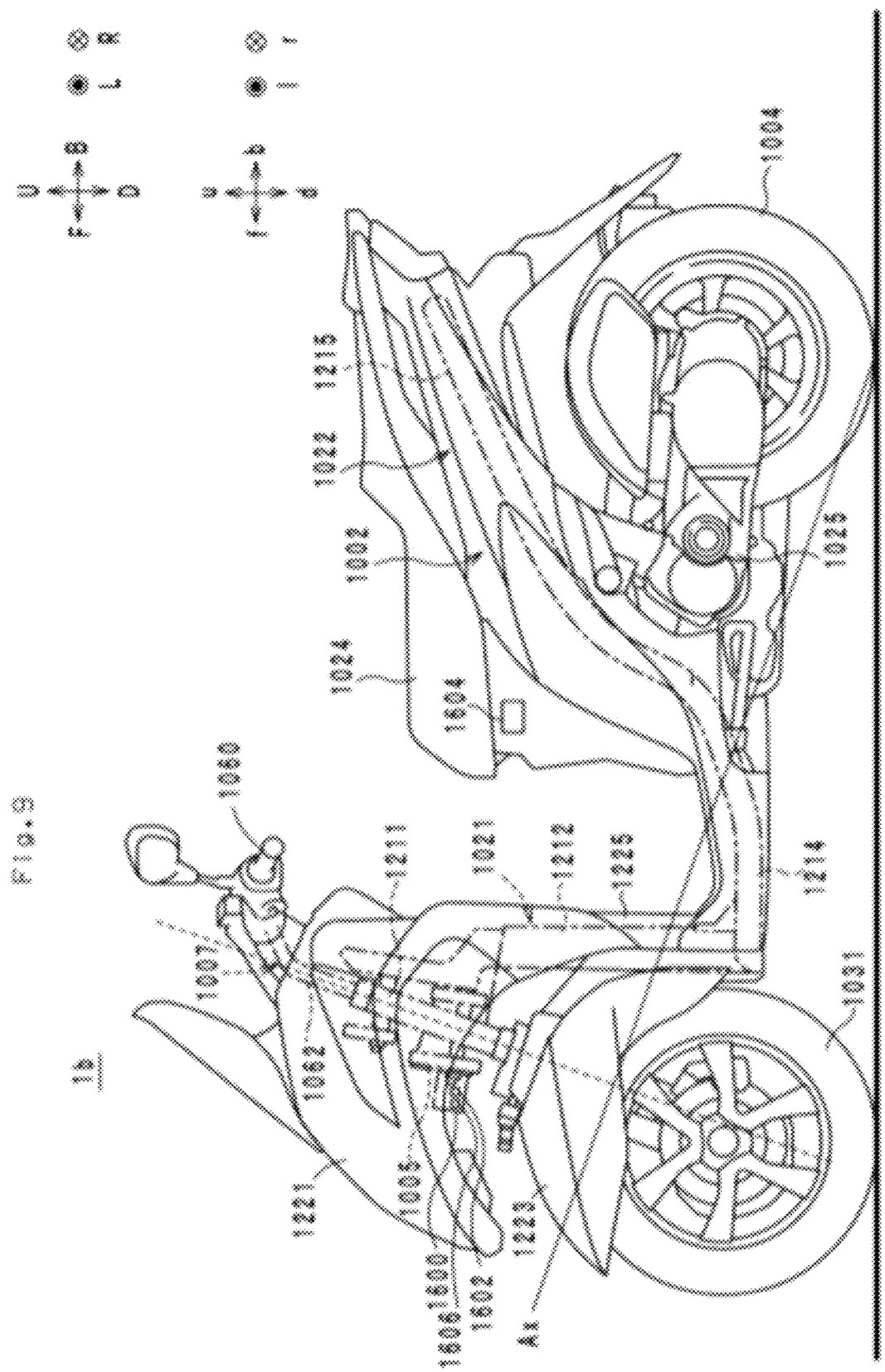
FIG. 9 is a looking-to-the-right view, with respect to a vehicle body frame 1021, of a leaning vehicle 1*b* when the vehicle body frame 1021 is in an upright posture.
Figure 10:
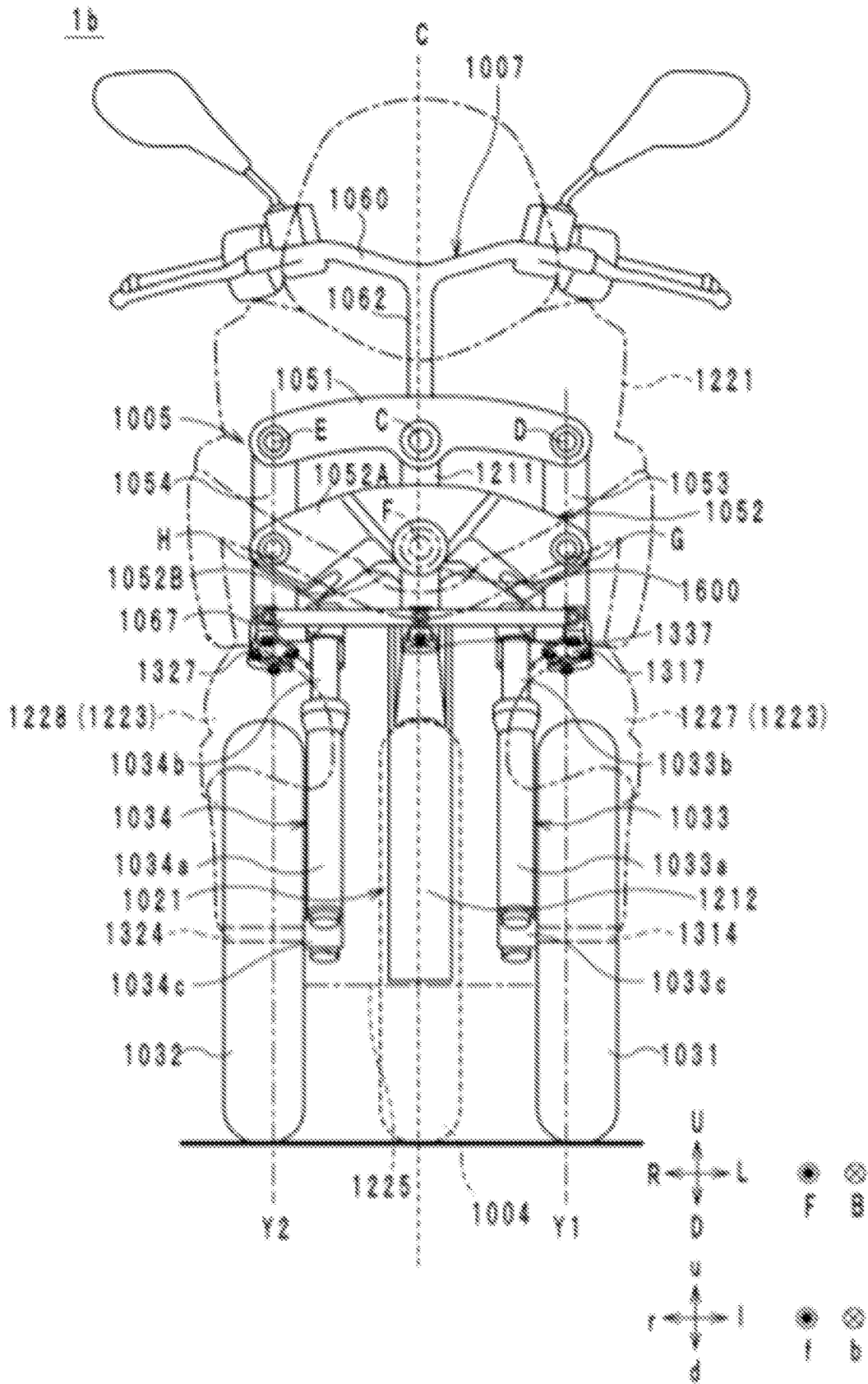
FIG. 10 is a looking-to-the-back view, with respect to the vehicle body frame 1021, of a front part of a leaning vehicle 1*b* when the vehicle body frame 1021 is in an upright posture.

The overall structure of a leaning vehicle 1*b* according to a second embodiment will hereinafter be described with reference to the drawings. In the present embodiment, a three-wheeled leaning vehicle including a vehicle body frame capable of leaning, two front wheels, and a rear wheel is described as an example of the leaning vehicle 1*b*. FIG. 9 is a looking-to-the right (r) view, with respect to the vehicle body frame 21, of the leaning vehicle 1*b* when the vehicle body frame 21 is in an upright posture. FIG. 10 is a looking-to-the-back view, with respect to the vehicle body frame 21, of the front part of the leaning vehicle 1*b* when the vehicle body frame 21 is in an upright posture. In FIG. 10, the vehicle body cover 22 is shown as being transparent.

As shown in FIG. 9, the leaning vehicle 1*b* includes a vehicle body 1002, a left front wheel 1031, a right front wheel 1032 (see FIG. 10), a rear wheel 1004, a link mechanism 1005, and a steering mechanism 1007. The vehicle body 1002 includes a vehicle body frame 1021, a vehicle body cover 1022, a seat 1024, and a power unit 1025.

The vehicle body frame 1021 leans in the leftward direction L when the leaning vehicle 1*b* is turning left. The vehicle body frame 1021 leans in the rightward direction R when the leaning vehicle 1*b* is turning right. The vehicle body frame 1021 includes a head pipe 1211, a down frame 1212, an underframe 1214, and a rear frame 1215. In FIG. 9, the part of the vehicle body frame 1021 covered by the vehicle body cover 1022 is indicated by a chain line. The vehicle body frame 1021 supports the seat 1024, the power unit 1025, etc.

The head pipe 1211 is positioned in the front part of the leaning vehicle 1*b*. The front part of the leaning vehicle 1*b* is a part thereof that is in front of the front edge of the seat 1024 in the forward direction f. The rear part of the leaning vehicle 1*b* is a part thereof that is behind the front edge of the seat 1024 in the backward direction b. The head pipe 1211 is inclined from the up-down direction ud such that the upper end part of the head pipe 1211 is positioned behind the lower end part of the head pipe 1211 in the backward direction b in a view in the leftward direction l or the rightward direction r.

The down frame 1212 is positioned behind the head pipe 1211 in the backward direction b. The down frame 1212 is a cylindrical member extending along the up-down direction ud. The upper end part of the down frame 1212 is positioned farther in the backward direction b than the head pipe 1211 in a view in the leftward direction l. The down frame 1212 extends from its upper end part to the downward direction d. The upper end part of the down frame 1212 is fixed to the lower end part of the head pipe 1211 via a connecting part (not shown).

The underframe 1214 extends from the lower end part of the down frame 1212 to the backward direction b. The rear frame 1215 linearly extends from the rear edge of the underframe 1214 to a backward and upward direction b, u.

The vehicle body frame 1021 is covered by the vehicle body cover 1022. The vehicle body cover 1022 includes a front cover 1221, a pair of right and left front fenders 1223, and a leg shield 1225. The front cover 1221 is positioned farther in the forward direction f than the seat 1024. The front cover 1221 covers at least some part of the steering mechanism 1007 and the link mechanism 1005.

The power unit 1025 includes a power source, such as an engine, an electric motor or the like, and a power transmission system, such as a transmission device or the like.

The seat 1024 is to be sat on by a rider. The seat 1024 is supported by the rear frame 1215.

The left front wheel 1031 is a left steerable wheel of the leaning vehicle 1*b*. The left front wheel 1031 is positioned in the front part of the leaning vehicle 1*b*. As shown in FIG. 10, the left front wheel 1031 is positioned to the left (l) of the center of the vehicle body frame 1021 with respect to the left-right direction lr. The left front wheel 1031 is rotatable around a left front axle 1314 (an example of an axle of a left steerable wheel).

The right front wheel 1032 is a right steerable wheel of the leaning vehicle 1*b*. The right front wheel 1032 is positioned in the front part of the leaning vehicle 1*b*. As shown in FIG. 10, the right front wheel 1032 is positioned to the right (r) of the center of the vehicle body frame 1021 with respect to the left-right direction lr. The right front wheel 1032 is rotatable around a right front axle 1324 (an example of an axle of a right steerable wheel). The left front wheel 1031 and the right front wheel 1032 are arranged lateral-symmetrically with respect to the center.

As shown in FIG. 10, the pair of front fenders 1223 includes a left front fender 1227 and a right front fender 1228. The left front fender 1227 is positioned farther in the upward direction u than the left front wheel 1031. The right front fender 1228 is positioned farther in the upward direction u than the right front wheel 1032.

The rear wheel 1004 is a driving wheel of the leaning vehicle 1*b*. The rear wheel 1004 is rotated by a driving force generated by the power unit 1025. The rear wheel 1004 is positioned in the rear part of the leaning vehicle 1*b*. The rear wheel 1004 is rotatable around an axle.

[Steering Mechanism]

The steering mechanism 1007 will hereinafter be described with reference to the drawings. FIG. 11 is a looking-to-the-down (d) view of the front part of the leaning vehicle 1*b* when the vehicle body frame 1021 is in an upright posture. In FIG. 11, the vehicle body cover 1022 is shown as being transparent.

The steering mechanism 1007 is configured to steer the left front wheel 1031 and the right front wheel 1032 in accordance with the rider's manipulation. As shown in FIGS. 10 and 11, the steering mechanism 1007 includes a left shock absorber 1033, a right shock absorber 1034, a handlebar 1060, a steering shaft 1062, a tie rod 1067, a left bracket 1317, a right bracket 1327, and a center bracket 1337.

The left shock absorber 1033 supports the left front wheel 1031 such that the left front wheel 1031 is movable along the up-down direction ud relative to the vehicle body frame 1021. The left shock absorber 1033 includes a left lower portion 1033*a*, a left upper portion 1033*b*, and a left support portion 1033*c*. The left lower portion 1033*a* extends along the up-down direction ud. The left support portion 1033*c* is positioned in the lower end part of the left lower portion 1033*a*. The left support portion 1033*c* supports the left front wheel 1031 such that the left front wheel 1031 is rotatable. The left front wheel 1031 is rotatable around the left front axle 1314. The left front axle 1314 extends from the left support portion 1033*c* to the leftward direction l. The left upper portion 1033*b* extends along the up-down direction ud. The left upper portion 1033*b* is positioned father in the upward direction u than the left lower portion 1033*a* with the lower end part thereof inserted in the left lower portion 1033*a*. The upper end part of the left upper portion 1033*b* is fixed to the left bracket 1317, which will be described later. Accordingly, the left upper portion 1033*b* is supported by a left side member 1053, which will be described later.

The left shock absorber 1033 is what is called a telescopic shock absorber. The left shock absorber 1033, for example, includes a combination of a damper and a spring. The left upper portion 1033*b* moves relative to the left lower portion 1033*a* in the extending direction of the left lower portion 1033*a*, and accordingly, the left shock absorber 1033 is expandable and contractable in the direction. In this way, the left shock absorber 1033 absorbs displacements of the left front wheel 1031 in the up-down direction ud relative to the left upper portion 1033*b*.

The right shock absorber 1034 supports the right front wheel 1032 such that the right front wheel 1032 is movable along the up-down direction ud relative to the vehicle body frame 1021. The right shock absorber 1034 includes a right lower portion 1034*a*, a right upper portion 1034*b*, and a right support portion 1034*c*. The right lower portion 1034*a* extends along the up-down direction ud. The right support portion 1034*c* is positioned in the lower end part of the right lower portion 1034*a*. The right support portion 1034*c* supports the right front wheel 1032 such that the right front wheel 1032 is rotatable. The right front wheel 1032 is rotatable around the right front axle 1324. The right front axle 1324 extends from the right support portion 1034*c* to the rightward direction r. The right upper portion 1034*b* extends along the up-down direction ud. The right upper portion 1034*b* is positioned father in the upward direction u than the right lower portion 1034*a* with the lower end part thereof inserted in the right lower portion 1034*a*. The upper end part of the right upper portion 1034*b* is fixed to the right bracket 1327, which will be described later. Accordingly, the right upper portion 1034*b* is supported by a right side member 1054, which will be described later.

The right shock absorber 1034 is what is called a telescopic shock absorber. The right shock absorber 1034, for example, includes a combination of a damper and a spring. The right upper portion 1034*b* moves relative to the right lower portion 1034*a* in the extending direction of the right lower portion 1034*a*, and accordingly, the right shock absorber 1034 is expandable and contractable in the direction. In this way, the right shock absorber 1034 absorbs displacements of the right front wheel 1032 in the up-down direction ud relative to the right upper portion 1034*b*.

The handlebar 1060 is to be manipulated by the rider. The steering shaft 1062 is supported by the vehicle body frame 1021 in a rotatable manner on its central axis in accordance with the rider's manipulation of the handlebar 1060. More specifically, the steering shaft 1062 is inserted in the head pipe 1211 and thereby is supported by the head pipe 1211 in a rotatable manner. The handlebar 1060 is fixed to the upper end part of the steering shaft 1062. Then, when the rider manipulates the handlebar 1060, the steering shaft 1062 rotates on its central axis.

The center bracket 1337 is fixed to the lower end part of the steering shaft 1062. Accordingly, the center bracket 1337 is rotatable around the central axis of the steering shaft 1062 together with the steering shaft 1062.

The tie rod 1067 transmits the rotation of the steering shaft 1062 caused by the rider's manipulation of the handlebar 1060 to the left shock absorber 1033 and the right shock absorber 1034. The tie rod 1067 extends along the left-right direction LR. The center of the tie rod 1067 with respect to the left-right direction LR is supported by the center bracket 1337. The left end part of the tie rod 1067 is supported by the left bracket 1317. The right end part of the tie rod 1067 is supported by the right bracket 1327.

[Link Mechanism]

The link mechanism 1005 will hereinafter be described with reference to FIGS. 10 and 11. The link mechanism 1005 is a parallelogram link mechanism. The link mechanism 1005 is positioned below the handlebar 1060 in the downward direction d. The link mechanism 1005 is supported by the head pipe 1211 of the vehicle body frame 1021.

The link mechanism 1005 includes an upper cross member 1051, a lower cross member 1052, a left side member 1053 and a right side member 1054. The upper cross member 1051, the lower cross member 1052, the left side member 1053 and the right side member 1054 are link members that are displaceable relative to the vehicle body frame 1021. In the present specification, a displacement includes a displacement by translation, a displacement by rotation, and a displacement by combination of translation and rotation.

The upper cross member 1051 extends along the left-right direction LR. The upper cross member 1051 is positioned father in the forward direction f than the head pipe 1211 and above the left front wheel 1031 and the right front wheel 1032 in the upward direction u. The upper cross member 1051 is supported by the head pipe 1211 via a support C. The support C is positioned in a middle part of the upper cross member 1051 and in the upper part of the head pipe 1211. When the upper cross member 1051 is divided into three equal parts along the left-right direction LR, the part positioned farthest in the leftward direction L of the three parts is a left part of the upper cross member 1051. When the upper cross member 1051 is divided into three equal parts along the left-right direction LR, the part positioned farthest in the rightward direction R of the three parts is a right part of the upper cross member 1051. When the upper cross member 1051 is divided into three equal parts along the left-right direction LR, t the part positioned in the middle of the three parts is a middle part of the upper cross member 1051. The support C is a shaft extending along the front-back direction fb. The support C extends from the head pipe 1211 to the forward direction f, slightly inclined to the upward direction u. The upper cross member 1051 is rotatable around the support C and accordingly rotatable relative to the head pipe 1211.

The lower cross member 1052 includes a front lower cross member 1052A and a rear lower cross member 1052B. The front lower cross member 1052A extends along the left-right direction LR. The front lower cross member 1052A is positioned farther in the forward direction f than the head pipe 1211, below the upper cross member 1051 in the downward direction d, and above the left front wheel 1031 and the right front wheel 1032 in the upward direction u. The front lower cross member 1052A is supported by the head pipe 1211 via a support F. The support F is positioned in a middle part of the front lower cross member 1052A and in the lower part of the head pipe 1211. When the front lower cross member 1052A is divided into three equal parts along the left-right direction LR, the part positioned farthest in the leftward direction L of the three parts is a left part of the front lower cross member 1052A. When the front lower cross member 1052A is divided into three equal parts along the left-right direction LR, the part positioned farthest in the rightward direction R of the three parts is a right part of the front lower cross member 1052A. When the front lower cross member 1052A is divided into three equal parts along the left-right direction LR, the part positioned in the middle of the three parts is a middle part of the front lower cross member 1052A. The support F is a shaft extending along the front-back direction fb. The support F extends from the head pipe 1211 to the forward direction f, slightly inclined to the upward direction u. The front lower cross member 1052A is rotatable around the support F and accordingly rotatable relative to the head pipe 1211.

The rear lower cross member 1052B extends along the left-right direction LR. The rear lower cross member 1052B is positioned farther in the backward direction b than the head pipe 1211, below the upper cross member 1051 in the downward direction d, and above the left front wheel 1031 and the right front wheel 1032 in the upward direction u. The rear lower cross member 1052B is supported by the head pipe 1211 via the support F. The support F is positioned in a middle part of the rear lower cross member 1052B and in the lower part of the head pipe 1211. When the rear lower cross member 1052B is divided into three equal parts along the left-right direction LR, the part positioned farthest in the leftward direction L of the three parts is a left part of the rear lower cross member 1052B. When the rear lower cross member 1052B is divided into three equal parts along the left-right direction LR, the part positioned farthest in the rightward direction R of the three parts is a right part of the rear lower cross member 1052B. When the rear lower cross member 1052B is divided into three equal parts along the left-right direction LR, the part positioned in the middle of the three parts is a middle part of the rear lower cross member 1052B. As mentioned above, the support F is a shaft extending along the front-back direction fb. The support F extends from the head pipe 1211 also to the backward direction b, slightly inclined to the downward direction d. The rear lower cross member 1052B is rotatable around the support F and accordingly rotatable relative to the head pipe 1211.

The left side member 1053 extends along the up-down direction ud. Accordingly, the extending direction of the left side member 1053 is parallel to the extending direction of the head pipe 1211. The left side member 1053 is positioned farther in the leftward direction l than the head pipe 1211. The left side member 1053 is positioned farther in the upward direction u than the left front wheel 1031 and farther in a left-upward direction lu than the left shock absorber 1033. The left side member 1053 is supported by the upper cross member 1051 via a support D. The support D is positioned in the upper part of the left side member 1053 and in the left part of the upper cross member 1051. The support D is a shaft extending along the front-back direction fb. The left side member 1053 is rotatable around the support D and accordingly rotatable relative to the upper cross member 1051.

Also, the left side member 1053 is supported by the front lower cross member 1052A and the rear lower cross member 1052B via a support G. The support G is positioned in the lower part of the left side member 1053, in the left part of the front lower cross member 1052A and in the left part of the rear lower cross member 1052B. The support G is a shaft extending along the front-back direction fb. The left side member 1053 is rotatable around the support G and accordingly rotatable relative to the front lower cross member 1052A and the rear lower cross member 1052B.

The left bracket 1317 is supported by the lower end part of the left side member 1053. The left bracket 1317 is rotatable around a left central axis Y1 and rotatable relative to the left side member 1053. The left central axis Y1 is a central axis of the left side member 1053. The left central axis Y1 extends along the up-down direction ud.

The right side member 1054 extends along the up-down direction ud. Accordingly, the extending direction of the right side member 1054 is parallel to the extending direction of the head pipe 1211. The right side member 1054 is positioned farther in the rightward direction r than the head pipe 1211. The right side member 1054 is positioned farther in the upward direction u than the right front wheel 1032 and farther in a right-upward direction ru than the right shock absorber 1034. The right side member 1054 is supported by the upper cross member 1051 via a support E. The support E is positioned in the upper part of the right side member 1054 and in the right part of the upper cross member 1051. The support E is a shaft extending along the front-back direction fb. The right side member 1054 is rotatable around the support E and accordingly rotatable relative to the upper cross member 1051.

Also, the right side member 1054 is supported by the front lower cross member 1052A and the rear lower cross member 1052B via a support H. The support H is positioned in the lower part of the right side member 1054, in the right part of the front lower cross member 1052A and in the right part of the rear lower cross member 1052B. The support H is a shaft extending along the front-back direction fb. The right side member 1054 is rotatable around the support H and accordingly rotatable relative to the front lower cross member 1052A and the rear lower cross member 1052B.

The right bracket 1327 is supported by the lower end part of the right side member 1054. The right bracket 1327 is rotatable around a right central axis Y2 and rotatable relative to the right side member 1054. The right central axis Y2 is a central axis of the right side member 1054. The right central axis Y2 extends along the up-down direction ud.

As described above, the upper cross member 1051, the lower cross member 1052, the left side member 1053 and the right side member 1054 are connected to one another such that the upper cross member 1051 and the lower cross member 1052 are kept parallel to each other and such that the left side member 1053 and the right side member are kept parallel to each other.

The left shock absorber 1033 is positioned farther in a right-downward direction rd than the left side member 1053. The left shock absorber 1033 is supported by the left bracket 1317. Specifically, the upper end part of the left shock absorber 1033 is fixed to the left bracket 1317. Further, the left shock absorber 1033 supports the left front wheel 1031. Accordingly, the left side member 1053 supports the left front wheel 1031 via the left bracket 1317 and the left shock absorber 1033. In this way, the link mechanism 1005 supports the left front wheel 1031. The left shock absorber 1033 leans in the left-right direction LR together with the left side member 1053.

The right shock absorber 1034 is positioned farther in a left-downward direction ld than the right side member 1054. The right shock absorber 1034 is supported by the right bracket 1327. Specifically, the upper end part of the right shock absorber 1034 is fixed to the right bracket 1327. Further, the right shock absorber 1034 supports the right front wheel 1032. Accordingly, the right side member 1054 supports the right front wheel 1032 via the right bracket 1327 and the right shock absorber 1034. In this way, the link mechanism 1005 supports the right front wheel 1032. The right shock absorber 1034 leans in the left-right direction LR together with the right side member 1054.

[Steering Motion]

Next, steering motions of the leaning vehicle 1b will be described with reference to FIG. 12. FIG. 12 is a looking-to-the-down (d) view of the front part of the leaning vehicle 1b when the leaning vehicle 1b is steered leftward.

As shown in FIG. 12, when the rider steers the handlebar 1060 leftward, the steering shaft 1062 rotates counterclockwise in a view in the downward direction d. Since the center bracket 1337 is fixed to the lower end part of the steering shaft 1062, the center bracket 1337 rotates counterclockwise in a view in the downward direction d together with the steering shaft 1062.

The tie rod 1067 makes a parallel translation in a backward and leftward direction l, b with the rotation of the center bracket 1337. The left end part of the tie rod 1067 is supported by the front end part of the left bracket 1317. The left bracket 1317 is rotatable around the left central axis Y1 (see FIG. 10). Accordingly, with the parallel translation of the tie rod 1067, the left bracket 1317 rotates counterclockwise in a view in the downward direction d. Also, the right end part of the tie rod 1067 is supported by the front end part of the right bracket 1327. The right bracket 1327 is rotatable around the right central axis Y2 (see FIG. 10). Accordingly, with the parallel translation of the tie rod 1067, the right bracket 1327 rotates counterclockwise in a view in the downward direction d.

The left front wheel 1031 is connected to the left bracket 1317 via the left shock absorber 1033. Therefore, with the rotation of the left bracket 1317, the left front wheel 1031 rotates counterclockwise around the left central axis Y1 (see FIG. 10) in a view in the downward direction d. Also, the right front wheel 1032 is connected to the right bracket 1327 via the right shock absorber 1034. Therefore, with the rotation of the right bracket 1327, the right front wheel 1032 rotates counterclockwise around the right central axis Y2 (see FIG. 10) in a view in the downward direction d.

When the rider steers the handlebar 1060 rightward, each of the elements described above rotates in a direction opposite to the direction of rotation when the rider steers the handlebar 1060 leftward (that is, rotates clockwise). Thus, the motion of each of the elements is laterally reversed, and no more description will be provided.

[Leaning Motion]

Figure 13:
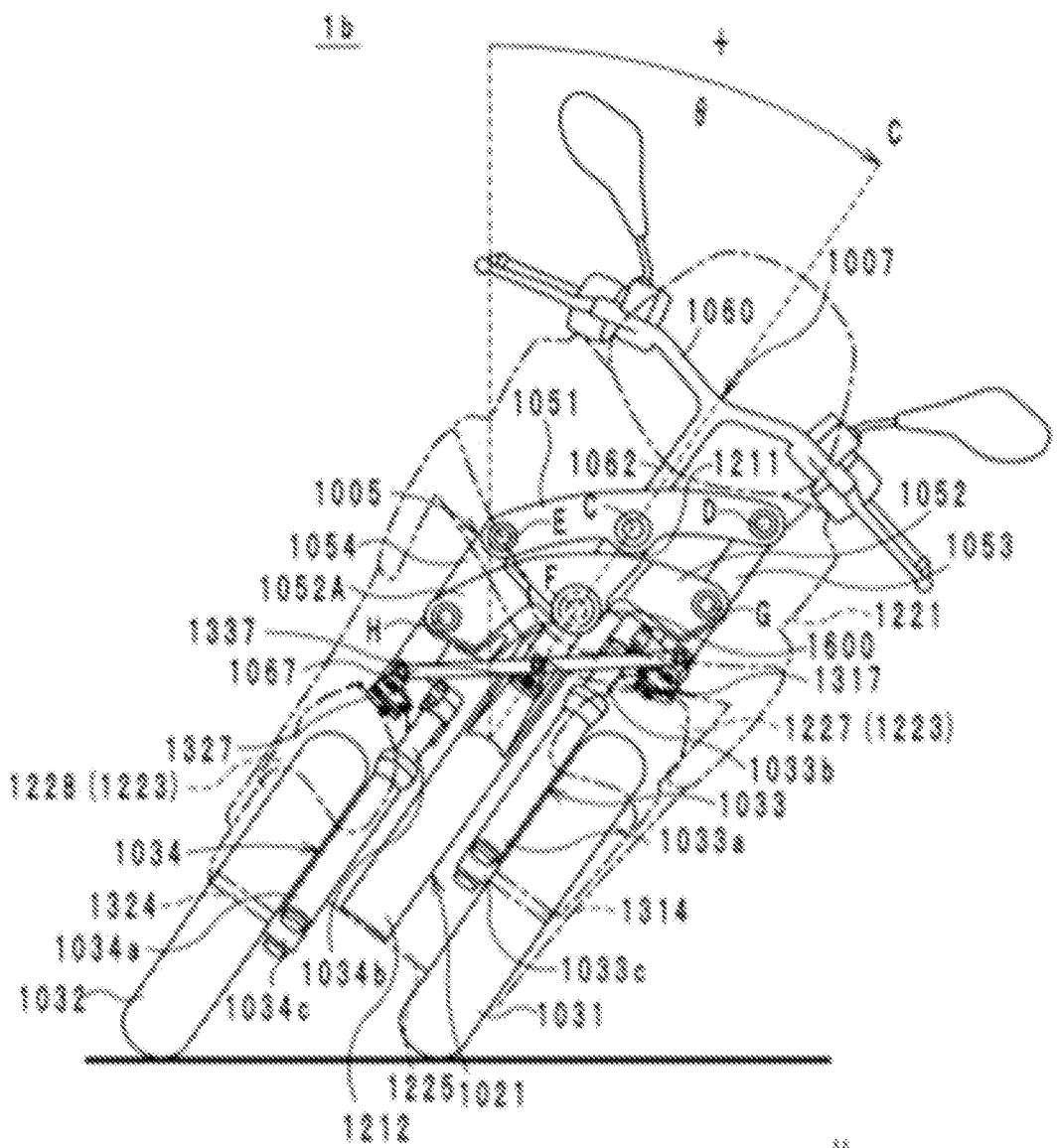
FIG. 13 is a looking-to-the-back (b) view of the front part of the leaning vehicle 1b when the vehicle body frame 1021 leans in a leftward direction L.

Next, leaning motions of the leaning vehicle 1b will be described with reference to the drawings. FIG. 13 is a looking-to-the-back (b) view of the front part of the leaning vehicle 1b when the vehicle body frame 1021 leans in the leftward direction L.

The vehicle body frame 1021 rotates around the roll axis Ax and thereby leans in the leftward direction L or the rightward direction R. The roll axis Ax is an axis extending along the front-back direction FB. More specifically, as shown in FIG. 9, the roll axis Ax is a straight line that passes the contact point between the rear wheel 1004 and the ground and is perpendicular to the steering shaft 1062 when the vehicle body frame 1021 is in an upright posture.

As the vehicle body frame 1021 is rotating around the roll axis Ax, the rotation angle of the vehicle body frame 1021 around the roll axis Ax changes, and the rotation angle of the vehicle body frame 1021 around the roll axis Ax is referred to as a roll angle θ. The roll angle θ of the leaning vehicle 1b is the same as the roll angle θ of the leaning vehicle 1a, and the description is omitted.

As shown in FIG. 13, when the leaning vehicle 1b is turning left, the upper cross member 1051, the lower cross member 1052, the left side member 1053 and the right side member 1054 of the link mechanism 1005 displace relative to the vehicle body frame 1021 such that the left front axle 1314 is positioned above the right front axle 1324 in the upward direction u, and thereby, the vehicle body frame 1021 is caused to lean in the leftward direction L. In this case, the roll angle θ is a positive value. Also, when the leaning vehicle 1b is turning right, the upper cross member 1051, the lower cross member 1052, the left side member

1053 and the right side member 1054 of the link mechanism 1005 displace relative to the vehicle body frame 1021 such that the right front axle 1324 is positioned above the left front axle 1314 in the upward direction u, and thereby, the vehicle body frame 1021 is caused to lean in the rightward direction R. In this case, the roll angle θ is a negative value. A case in which the vehicle body frame 1021 leans in the leftward direction L will be described below as an example.

As shown in FIG. 13, with a shape change of the link mechanism 1005, the vehicle body frame 1021 leans from the upright posture to the leftward direction L. Specifically, as shown in FIG. 10, when the vehicle body frame 1021 is in an upright posture, the upper cross member 1051, the lower cross member 1052, the left side member 1053 and the right side member 1054 form a rectangle in the leaning vehicle 1b. On the other hand, as shown in FIG. 13, when the vehicle body frame 1021 leans in the leftward direction L, the upper cross member 1051, the lower cross member 1052, the left side member 1053 and the right side member 1054 form a parallelogram in the leaning vehicle 1b.

When the rider causes the vehicle body frame 1021 to lean in the leftward direction L, the head pipe 1211 leans in the leftward direction L. When the head pipe 1211 leans in the leftward direction L, the upper cross member 1051 rotates around the support C in such a manner as to rotate counterclockwise relative to the head pipe 1211 in a view in the backward direction b. In the same way, the lower cross member 1052 rotates around the support F in such a manner as to rotate counterclockwise relative to the head pipe 1211 in a view in the backward direction b. Then, in a view in the backward direction b, the upper cross member 1051 moves in the leftward direction L relative to the lower cross member 1052.

With the movement of the upper cross member 1051, the left side member 1053 rotates around the support D in such a manner as to rotate clockwise relative to the upper cross member 1051 in a view in the backward direction b. The right side member 1054 rotates around the support E in such a manner as to rotate clockwise relative to the upper cross member 1051 in a view in the backward direction b. With the movement of the upper cross member 1051, also, the left side member 1053 rotates around the support G in such a manner as to rotate clockwise relative to the lower cross member 1052 in a view in the backward direction b. The right side member 1054 rotates around the support H in such a manner as to rotate clockwise relative to the lower cross member 1052 in a view in the backward direction b. In this way, the left side member 1053 and the right side member 1054 lean in the leftward direction L while being kept parallel to the head pipe 1211.

The left bracket 1317 is supported by the lower end part of the left side member 1053. Therefore, when the left side member 1053 leans in the leftward direction L, the left bracket 1317 leans in the leftward direction L. The left shock absorber 1033 is supported by the left bracket 1317, and therefore, when the left bracket 1317 leans in the leftward direction L, the left shock absorber 1033 leans in the leftward direction L. The left front wheel 1031 is supported by the lower end part of the left shock absorber 1033, and therefore, when the left shock absorber 1033 leans in the leftward direction L, the left front wheel 1031 leans in the leftward direction L.

The right bracket 1327 is supported by the lower end part of the right side member 1054. Therefore, when the right side member 1054 leans in the leftward direction L, the right bracket 1327 leans in the leftward direction L. The right shock absorber 1034 is supported by the right bracket 1327, and therefore, when the right bracket 1327 leans in the leftward direction L, the right shock absorber 1034 leans in the leftward direction L. The right front wheel 1032 is supported by the lower end part of the right shock absorber 1034, and therefore, when the right shock absorber 1034 leans in the leftward direction L, the right front wheel 1032 leans in the leftward direction L.

The rear wheel 1004 (not shown in FIG. 13) is supported by the vehicle body frame 1021. Therefore, the rear wheel 1004 leans in the leftward direction L together with the vehicle body frame 1021.

When the vehicle body frame 1021 leans in the rightward direction R, each of the elements described above moves in a direction opposite to the direction of motion when the vehicle body frame 1021 is leaning in the leftward direction L. Thus, the motion of each of the elements is laterally reversed, and no more description will be provided.

[Actuator Controller]

Figure 14:
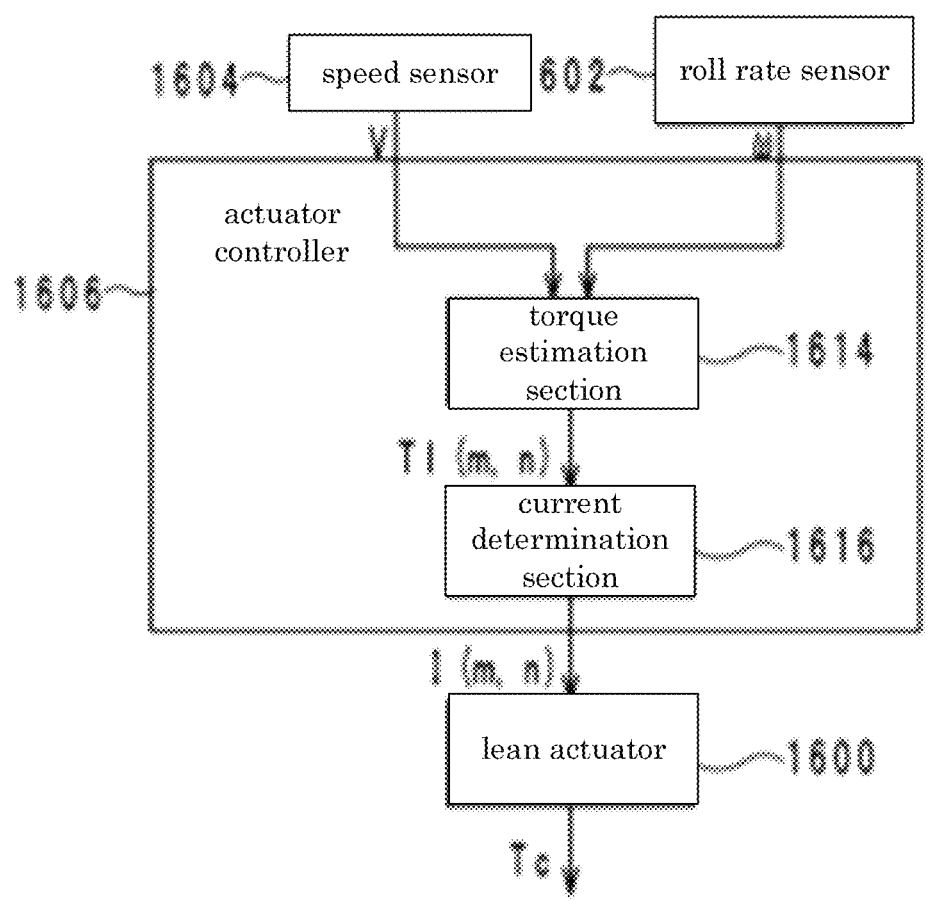
FIG. 14 is a block diagram of an actuator controller 1606.

Next, the actuator controller 1606 of the leaning vehicle 1b will be described with reference to the drawings. FIG. 14 is a block diagram of the actuator controller 1606.

As shown in FIG. 14, the leaning vehicle 1b further includes a lean actuator 1600, a roll rate sensor 1602, a speed sensor 1604, and an actuator controller 1606.

The lean actuator 1600 outputs a posture control torque Td to displace the upper cross member 1051, the lower cross member 1052, the left side member 1053 and the right side member 1054 relative to the vehicle body frame 1021. The posture control torque Td is a torque to control the posture of the vehicle body frame 1021. In order to cause the vehicle body 1021 to lean, it is necessary to apply a torque to the lower cross member 1052. A lean torque Tl is applied to the lower cross member 1052, and the lean torque Tl has a strength required to cause the vehicle body frame 1021 of the leaning vehicle 1b running at a speed V to roll at a roll rate ω. The lean torque Tl is a moment acting around the support F. When the lean torque Tl acts counterclockwise in a view in the backward direction b, the lower cross member 1052 is rotated counterclockwise (in a positive direction) by the lean torque Tl. When the lean torque Tl acts clockwise in a view in the backward direction b, the lower cross member 1052 is rotated clockwise (in a negative direction) by the lean torque Tl. The lean actuator 1600 outputs a posture control torque Td to assist the rider in applying the lean torque Tl to the lower cross member 1052.

The lean actuator 1600 is fixed to the support F of the vehicle body frame 1021. The lean actuator 1600 includes a combination of an electric motor and a gear. The electric motor generates a torque. The torque generated by the electric motor is outputted to the lower cross member 1052 as a posture control torque Td via the gear. In this way, the lean actuator 1600 causes the lower cross member 1052 to rotate around the support F relative to the head pipe 1211.

The roll rate sensor 1602 detects the roll rate ω that is the amount of change per unit time of the roll angle θ. The roll rate ω of the leaning vehicle 1b is the same as the roll rate ω of the leaning vehicle 1a, and the description is omitted. The roll rate sensor 1602 is, for example, supported by the vehicle body frame 1021 in such a manner as not to be displaceable relative to the vehicle body frame 1021. In the leaning vehicle 1b, the roll rate sensor 1602 is fixed to the lean actuator 1600.

The speed sensor 1604 detects the speed V of the leaning vehicle 1b. The speed V is a positive value when the leaning vehicle 1b is running forward.

The actuator controller 1606 is, for example, an IC (integrated circuit) for control of the lean actuator 1600.

However, the actuator controller 1606 does not need to be achieved by a single IC, and the actuator controller 1606 may be a combination of one or more ICs, one or more electronic components and/or one or more circuit boards.

The actuator controller 1606 obtains the roll rate ω from the roll rate sensor 1602. Specifically, an electric signal representing the roll rate ω (which will hereinafter be referred to simply as roll rate ω) detected by the roll rate sensor 1602 is inputted to the actuator controller 1606.

The actuator controller 1606 obtains the speed V from the speed sensor 1604. Specifically, an electric signal representing the speed V (which will hereinafter be referred to simply as speed V) detected by the speed sensor 1604 is inputted to the actuator controller 1606.

Even in a case where there is an input from the outside of the actuator controller 1606 to the actuator controller 1606 about the steering torque T applied around the steering shaft 1062 by the rider's manipulation of the handlebar 1060, the actuator controller 1606 controls the lean actuator 1600 not based on the steering torque T. Even in a case where there is an input from the outside of the actuator controller 1606 to the actuator controller 1606 about the roll angle θ, the actuator controller 1606 controls the lean actuator 1600 not based on the roll angle θ. The actuator controller 1606 controls the lean actuator 1600 based on the speed V detected by the speed sensor 1604 and the roll rate ω detected by the roll rate sensor 1602. Thus, the actuator controller 1606 uses neither the steering torque T detected by a torque sensor or the like nor the roll angle θ detected by a roll sensor or the like.

As shown in FIG. 14, the actuator controller 1606 includes a torque estimation section 1614 and a current determination section 1616. The torque estimation section 1614 determines an estimated lean torque Tl(m, n), which is an estimated value of the lean torque Tl, based on the speed V and the roll rate ω. The values m and n are integers. The torque estimation section 1614 stores an estimated lean torque determination table as shown by TABLE 3.

The speed V(m) and the roll rate ω(n) of the leaning vehicle 1b are the same as the speed V(m) and the roll rate ω(n) of the leaning vehicle 1 and the description thereof is omitted.

When the value n is positive (when the roll rate ω(n) is a positive value), the estimated lean torque Tl(m, n) is a positive value. In this case, the estimated lean torque Tl(m, n) indicates a lean torque to cause the lower cross member 1052 to rotate counterclockwise (in the positive direction) in a view in the backward direction b. In this case, the greater the value n is (the greater the roll rate ω(n) is), the greater the estimated lean torque Tl(m, n) is. Also, the greater the value m is (the greater the speed V(m) is), the greater the estimated lean torque Tl(m, n) is.

On the other hand, when the value n is negative (when the roll rate ω(n) is a negative value), the estimated lean torque Tl(m, n) is a negative value. In this case, the estimated lean torque Tl(m, n) indicates a lean torque to cause the lower cross member 1052 to rotate clockwise (in the negative direction) in a view in the backward direction b. In this case, the smaller the value n is (the smaller the roll rate ω(n) is), the smaller the estimated lean torque Tl(m, n) is (the greater the absolute value of the estimated lean torque Tl(m, n) is). Also, the greater the value m is (the greater the speed V(m) is), the smaller the estimated lean torque Tl(m, n) is (the greater the absolute value of the estimated lean torque Tl(m, n) is).

The torque estimation section 1614 identifies a speed V(m) that is closest to the speed V that the actuator controller 1606 has obtained. Also, the torque estimation section 1614 identifies a roll rate ω(n) that is closest to the roll rate ω that the actuator controller 1606 has obtained. Then, the torque estimation section 1614 determines an estimated lean torque Tl(m, n) in association with the speed V(m) and the roll rate ω(n) with reference to TABLE 3.

The current determination section 1616 controls the lean actuator 1600 based on the estimated lean torque Tl(m, n) determined by the torque estimation section 1614. Specifically, the current determination section 1616 determines a control current value I(m, n) to be outputted to the lean

TABLE 3

| | | ω(n)(deg/s) | | | | | | | | | | | |
|---|---|---|---|---|---|---|---|---|---|---|---|---|---|
| | | ... ω(−5) | ω(−4) | ω(−3) | ω(−2) | ω(−1) | ω(0) = 0 | ω(1) | ω(2) | ω(3) | ω(4) | ω(5) | ... |
| V(m) (km/h) | V(1) | ... Tl(1, −5) | Tl(1, −4) | Tl(1, −3) | Tl(1, −2) | Tl(1, −1) | Tl(1, 0) = 0 | Tl(1, 1) | Tl(1, 2) | Tl(1, 3) | Tl(1, 4) | Tl(1, 5) | ... |
| | V(2) | ... Tl(2, −5) | Tl(2, −4) | Tl(2, −3) | Tl(2, −2) | Tl(2, −1) | Tl(2, 0) = 0 | Tl(2, 1) | Tl(2, 2) | Tl(2, 3) | Tl(2, 4) | Tl(2, 5) | ... |
| | V(3) | ... Tl(3, −5) | Tl(3, −4) | Tl(3, −3) | Tl(3, −2) | Tl(3, −1) | Tl(3, 0) = 0 | Tl(3, 1) | Tl(3, 2) | Tl(3, 3) | Tl(3, 4) | Tl(3, 5) | ... |
| | V(4) | ... Tl(4, −5) | Tl(4, −4) | Tl(4, −3) | Tl(4, −2) | Tl(4, −1) | Tl(4, 0) = 0 | Tl(4, 1) | Tl(4, 2) | Tl(4, 3) | Tl(4, 4) | Tl(4, 5) | ... |
| | V(5) | ... Tl(5, −5) | Tl(5, −4) | Tl(5, −3) | Tl(5, −2) | Tl(5, −1) | Tl(5, 0) = 0 | Tl(5, 1) | Tl(5, 2) | Tl(5, 3) | Tl(5, 4) | Tl(5, 5) | ... |
| | ... | ... ... | ... | ... | ... | ... | ... | ... | ... | ... | ... | ... | |

In the estimated lean torque determination table, estimated lean torque Tl(m, n) are stored in association with values of the speed V(m) and values of the roll rate ω (n).

actuator 1600, based on the estimated lean torque Tl(m, n). Therefore, the current determination section 1616 stores a control current determination table as shown by TABLE 4.

TABLE 4

| ... Tl(1, −5) | Tl(1, −4) | Tl(1, −3) | Tl(1, −2) | Tl(1, −1) | Tl(1, 0) = 0 | Tl(1, 1) | Tl(1, 2) | Tl(1, 3) | Tl(1, 4) | Tl(1, 5) ... |
|---|---|---|---|---|---|---|---|---|---|---|
| I(1, −5) | I(1, −4) | I(1, −3) | I(1, −2) | I(1, −1) | I(1, 0) = 0 | I(1, 1) | I(1, 2) | I(1, 3) | I(1, 4) | I(1, 5) |
| ... Tl(2, −5) | Tl(2, −4) | Tl(2, −3) | Tl(2, −2) | Tl(2, −1) | Tl(2, 0) = 0 | Tl(2, 1) | Tl(2, 2) | Tl(2, 3) | Tl(2, 4) | Tl(2, 5) ... |
| I(2, −5) | I(2, −4) | I(2, −3) | I(2, −2) | I(2, −1) | I(2, 0) = 0 | I(2, 1) | I(2, 2) | I(2, 3) | I(2, 4) | I(2, 5) |
| ... Tl(3, −5) | Tl(3, −4) | Tl(3, −3) | Tl(3, −2) | Tl(3, −1) | Tl(3, 0) = 0 | Tl(3, 1) | Tl(3, 2) | Tl(3, 3) | Tl(3, 4) | Tl(3, 5) ... |
| I(3, −5) | I(3, −4) | I(3, −3) | I(3, −2) | I(3, −1) | I(3, 0) = 0 | I(3, 1) | I(3, 2) | I(3, 3) | I(3, 4) | I(3, 5) |
| ... Tl(4, −5) | Tl(4, −4) | Tl(4, −3) | Tl(4, −2) | Tl(4, −1) | Tl(4, 0) = 0 | Tl(4, 1) | Tl(4, 2) | Tl(4, 3) | Tl(4, 4) | Tl(4, 5) ... |
| I(4, −5) | I(4, −4) | I(4, −3) | I(4, −2) | I(4, −1) | I(4, 0) = 0 | I(4, 1) | I(4, 2) | I(4, 3) | I(4, 4) | I(4, 5) |

TABLE 4-continued

| ... | Tl(5, −5) | Tl(5, −4) | Tl(5, −3) | Tl(5, −2) | Tl(5, −1) | Tl(5, 0) = 0 | Tl(5, 1) | Tl(5, 2) | Tl(5, 3) | Tl(5, 4) | Tl(5, 5) | ... |
|---|---|---|---|---|---|---|---|---|---|---|---|---|
| | I(5, −5) | I(5, −4) | I(5, −3) | I(5, −2) | I(5, −1) | I(5, 0) = 0 | I(5, 1) | I(5, 2) | I(5, 3) | I(5, 4) | I(5, 5) | |
| ... | ... | ... | ... | ... | ... | ... | ... | ... | ... | ... | ... | ... |

In the control current determination table, estimated lean torque Tl(m, n) and control current values I(m, n) are stored in association with each other. The control current I(m, n) is a current that the lean actuator 1600 requires to output a posture control torque Td corresponding to the assist rate (for example, 20%) of the estimated lean torque Tl(m, n) to the lower cross member 1052. The lean actuator 1600 outputs a posture control torque Td corresponding to 20% of the estimated lean torque Tl(m, n) to the lower cross member 1052. Accordingly, the rider only needs to tilt the vehicle body frame 1021 to apply 80% of the estimated lean torque Tl(m, n) to the lower cross member 1052. In this way, the lean actuator 1600 assists the rider's manipulation to tilt the vehicle body frame 1021. The assist rate is an arbitrary value and may be a value other than 20%. In order to allow the rider to tilt the vehicle body frame 1021 with less power, the assist rate should be more than 20%. In order to allow the rider to tilt the vehicle body frame 1021 with more power, the assist rate should be less than 20%. The assist rate may be a negative value. In this case, the lean actuator 1600 outputs a posture control torque Td to resist the rider's manipulation to tilt the vehicle body frame 1021.

When the value n is positive, the control current I(m, n) is a positive value. In this case, the greater the value n is, the greater the control current I(m, n) is. Also, the greater the value m is, the greater the control current I(m, n) is. On the other hand, when the value n is negative, the control current I(m, n) is a negative value. In this case, the smaller the value n is, the smaller the control current I(m, n) is (the greater the absolute value of the control current I(m, n) is). Also, the greater the value m is, the smaller the control current value I(m, n) is (the greater the absolute value of the control current value I(m, n) is).

The lean actuator 1600 outputs a posture control torque Td to the lower cross member 1052 based on the control current value I(m, n) outputted from the actuator controller 1606. When receiving a positive control current value I(m, n), the lean actuator 1600 outputs a posture control torque Td to cause a counterclockwise rotation of the lower cross member 1052. In this case, the greater the absolute value of the control current value I(m, n) is, the greater the absolute value of the posture control torque Td is. Then, in a view in the backward direction B, the vehicle body frame 1021 rotates clockwise (in the positive direction) around the roll axis Ax at the roll rate ω. When receiving a negative control current value I(m, n), the lean actuator 1600 outputs a posture control torque Td to cause a clockwise rotation of the lower cross member 1052. In this case, the greater the absolute value of the control current value I(m, n) is, the greater the absolute value of the posture control torque Td is. Then, in a view in the backward direction B, the vehicle body frame 1021 rotates counterclockwise (in the negative direction) around the roll axis Ax at the roll rate ω.

Next, operations of the actuator controller 1606 will be described with reference to the drawings. FIG. 15 is a flowchart showing operations performed by the actuator controller 1606. The actuator controller 1606 performs a process that will be described below along a software program stored in a storage device (not shown).

The process is started when an ignition source of the leaning vehicle 1*b* is turned on. As long as the ignition source is on, the roll rate sensor 1602 keeps outputting the roll rate ω to the actuator controller 1606. Also, the speed sensor 1604 keeps outputting the speed V to the actuator controller 1606.

The torque estimation section 1614 obtains the roll rate ω from the roll rate sensor 1602 (step S11). Further, the torque estimation section 1614 obtains the speed V from the speed sensor 1604 (step S12).

Next, the torque estimation section 1614 identifies a roll rate ω(n) closest to the roll rate ω. Further, the torque estimation section 1614 identifies a speed V(m) closest to the speed V. Then, the torque estimation section 1614 determines an estimated lean torque Tl(m, n) corresponding to the roll rate ω(n) and the speed V(m) with reference to the estimation lean torque table as shown by TABLE 3 (step S13).

Next, the actuator controller 1606 determines a control current value I(m, n) corresponding to the estimated lean torque Tl(m, n) determined at step S13 (step S14). The current determination section 1616 outputs the control current value I(m, n) to the lean actuator 1600. The lean actuator 1600 outputs a posture control torque Td corresponding to the control current value I(m, n) to the lower cross member 1052. Thereafter, the process returns to step S11. The process from step S11 to S14 is repeated until the ignition source is switched from on to off.

[Effects]

The actuator controller 1606 can control the lean actuator 1600 in an unconventional manner. More specifically, in order to change the roll angle θ of the vehicle body frame 1021, the rider leans his/her body to the leftward direction L or the right ward direction R. Thereby, a lean torque Tl is applied to the lower cross member 1052, and the lower cross member 1052 rotates relative to the head pipe 1211. Then, the roll angle θ of the vehicle body frame 1021 is changed, and the posture of the vehicle body frame 1021 is changed. In this way, the rider can control the posture of the vehicle body frame 1021 by using the lean torque Tl that causes a rotation of the lower cross member 1052 as an input parameter.

When the rider greatly leans his/her body to the leftward direction L or the rightward direction R, the absolute value of the lean torque Tl to cause a rotation of the lower cross member 1052 becomes large, and the absolute value of the roll rate ω of the vehicle body frame 1021 becomes large. On the other hand, when the rider slightly leans his/her body to the leftward direction L or the rightward direction R, the absolute value of the lean torque Tl to cause a rotation of the lower cross member 1052 becomes small, and the absolute value of the roll rate ω of the vehicle body frame 1021 becomes small. Thus, there is a correlation between the lean torque Tl to cause a rotation of the lower cross member 1052 and the roll rate ω. Therefore, the roll rate ω can be used as an input parameter for posture control of the vehicle body frame 1021. Then, the actuator controller 1606 controls the lean actuator 1600 based on the roll rate ω.

The actuator controller 1606 controls the lean actuator 1600 based on neither the steering torque T nor the roll angle θ. In more detail, in the leaning vehicle 1b, since there is a correlation between the lean torque Tl and the roll rate ω, neither the steering torque T nor the lean torque Tl needs to be detected if the roll rate ω is detected. Thus, the actuator controller 1606 can control the lean actuator 1600 not based on the steering torque T, which is conventionally used for control of the lean actuator 1600.

Also, for the following reason, the actuator controller 1606 controls the lean actuator 1600 not based on the roll angle θ. In order to change the roll angle θ of the vehicle body frame 1021, it is necessary to tilt the left front wheel 1031 and the right front wheel 1032 while these front wheels are rotating. An angular momentum is occurring on the rotating left front wheel 1031 and the rotating right front wheel 1032. Therefore, the rider applies external force to the left front wheel 1031 and the right front wheel 1032 to change the direction of the angular momentum occurring on the left front wheel 1031 and the right front wheel 1032 without largely changing the absolute value of the angular momentum occurring thereon. The absolute value of the moment caused by the external force to change the direction of the angular momentum occurring on the left front wheel 1031 and the right front wheel 1032 is affected by the roll rate ω but not affected by the roll angle θ. For example, the absolute value of a moment required to change the roll angle θ of the left front wheel 1031 and the right front wheel 1032 from 45 degrees to 50 degrees in a unit time is equal to the absolute value of a moment required to change the roll angle θ of the left front wheel 1031 and the right front wheel 1032 from 50 degrees to 45 degrees in the unit time. Therefore, the present inventors had an idea that there is not a high correlation between the lean torque Tl and the roll angle θ. Accordingly, there is not a high correlation between the roll angle θ and the roll rate ω. Then, if the roll rate ω is detected, the actuator controller 1606 can control the lean actuator 1600 that outputs a posture control torque Td to control the posture of the vehicle body frame 1021 not based on the roll angle θ.

For the reasons above, the actuator controller 1606 can control the lean actuator 1600 based on the roll rate ω, neither the steering torque T nor the roll angle θ. Thus, the actuator controller 1606 can control the lean actuator 1600 in an unconventional manner.

In the leaning vehicle 1b, the roll rate sensor 1602 is supported by the vehicle body frame 1021 in such a manner as not to be displaceable relative to the vehicle body frame 1021. This inhibits a great delay of a posture change of the roll rate sensor 1602 from a posture change of the vehicle body frame 1021. As a result, the detection accuracy of the roll rate ω by the roll rate sensor 1602 can be improved.

Other Embodiments

The embodiments and modifications described herein and/or illustrated by the drawings are to make the present teaching easier to understand and not to limit the concept of the present teaching. It is possible to adapt or alter the embodiments and modifications described above without departing from the gist thereof.

The gist includes all equivalent elements, modifications, omissions, combinations (for example, combination of features of the embodiments and modifications), adaptations and alterations as would be appreciated by those skilled in the art based on the embodiments and modifications disclosed herein. The limitations in the claims are to be interpreted broadly based on the language employed in the claims and not limited to the embodiments and modifications described in the present specification or during the prosecution of the present application. Such embodiments and modifications are to be understood as non-exclusive. For example, the terms "preferable" and "good" in the present specification are to be understood as non-exclusive, and these terms mean "preferable but not limited to this" and "good but not limited to this", respectively.

The leaning vehicles 1, 1a and 1b each may include a torque sensor configured to detect the steering torque T. However, the leaning-vehicle-steering-actuator controller 606 controls the steering actuator 600 not based on the steering torque T detected by the torque sensor. The actuator controller 1606 controls the lean actuator 1600 not based on the steering torque T detected by the torque sensor.

The leaning vehicles 1, 1a and 1b each may include a roll sensor configured to detect the roll angle θ. However, the leaning-vehicle-steering-actuator controller 606 controls the steering actuator 600 not based on the roll angle θ detected by the roll sensor. The actuator controller 1606 controls the lean actuator 1600 not based on the roll angle θ detected by the roll sensor.

In the leaning vehicles 1 and 1a, the leaning-vehicle-steering-actuator controller 606 may calculate the roll angle θ by integrating the roll rate ω detected by the roll rate sensor 602. The leaning-vehicle-steering-actuator controller 606 may use the calculated roll angle θ for posture control of the vehicle body frame 21. In the leaning vehicle 1b, the actuator controller 1606 may calculate the roll angle θ by integrating the roll rate ω detected by the roll rate sensor 1602. The actuator controller 1606 may use the calculated roll angle θ for posture control of the vehicle body frame 1021.

Each of the leaning vehicles 1 and 1a may be a vehicle including two front wheels and one rear wheel, like the leaning vehicle 1b. The leaning vehicle 1b needs to include at least one rear wheel.

The link mechanism 1005 of the leaning vehicle 1b is a parallelogram link mechanism. However, the link mechanism 1005 does not need to be a parallelogram link mechanism, and may be a double wishbone link mechanism.

In the leaning vehicle 1a, the leaning-vehicle-steering-actuator controller 606 determines an estimated steering torque T(m, n) based on the speed V and the roll rate ω, and thereafter determines a control current value I(m, n) based on the estimated steering torque T(m, n). However, the leaning-vehicle-steering-actuator controller 606 may determine a control current value I(m, n) based on the speed V and the roll rate ω. In this case, the leaning-vehicle-steering-actuator controller 606 stores a table in which control current values I(m, n) are stored in association with values of the speed V(m) and values of the roll rate ω(n). Instead of such a table, a mathematical expression or a map may be used for the determination of an estimated steering torque T(m, n) and/or the determination of a control current value I(m, n).

In the leaning vehicle 1b, the actuator controller 1606 determines an estimated lean torque Tl(m, n) based on the speed V and the roll rate ω, and thereafter determines a control current value I(m, n) based on the estimated lean torque Tl(m, n). However, the actuator controller 1606 may determine a control current value I(m, n) based on the speed V and the roll rate ω. In this case, the actuator controller 1606 may store a table in which control current values I(m, n) are stored in association with values of the speed V and values of the roll rate ω. Instead of such a table, a mathematical expression or a map may be used for the determination of an estimated lean torque Tl(m, n) and/or the determination of a control current value I(m, n).

The above-described control method of the steering actuator 600 based on the speed V and the roll rate ω carried out in the leaning vehicle 1*a* is only an example, and the control method of the steering actuator 600 is not limited to this. In the control method of the steering actuator 600 based on the speed V and the roll rate ω, the estimated steering torque determination table and the control current determination table are not necessarily used. The leaning-vehicle-steering-actuator controller 606, for example, stores a reference control current value that is to be used for determination of a control current value to be outputted to the steering actuator 600. The reference control current value may be a constant value or may be a variable value that varies in association with any other parameter (for example, temperature) than the speed V and the roll rate ω. Then, the leaning-vehicle-steering-actuator controller 606 may determine a control current value by multiplying the reference control current value with a coefficient determined based on the speed V and the roll rate ω.

The above-described control method of the lean actuator 1600 based on the speed V and the roll rate ω carried out in the leaning vehicle 1*b* is only an example, and the control method of the lean actuator 1600 is not limited to this. In the control method of the lean actuator 1600 based on the speed V and the roll rate ω, the estimated lean torque determination table and the control current determination table are not necessarily used. The actuator controller 1606, for example, stores a reference control current value that is to be used for determination of a control current value to be outputted to the lean actuator 1600. The reference control current value may be a constant value or may be a variable value that varies in association with any other parameter (for example, temperature) than the speed V and the roll rate ω. Then, the actuator controller 1606 may determine a control current value by multiplying the reference control current value with a coefficient determined based on the speed V and the roll rate ω.

The roll rate sensor 602 may be supported by any other component than the steering actuator 600. When the leaning vehicle 1*a* includes an IMU (inertial measurement unit), the roll rate sensor 602 may be a roll rate sensor included in the IMU. The IMU is a unit configured to detect the inertia of the leaning vehicle 1*a*. In this case, the roll rate sensor 602 is supported by the case of the IMU. The IMU is supported by the vehicle body frame 21 via a rubber mount so that noise generated by the engine vibration will not be transmitted to sensors provided in the IMU. Therefore, when the roll rate sensor 602 is included in the IMU, the roll rate sensor 602 is supported by the vehicle body frame 21 in such a manner as to be slightly displaceable relative to the vehicle body frame 21. As with the roll rate sensor 602, the roll rate sensor 1602 may be included in such an IMU.

Each of the leaning vehicles 1 and 1*a* may be a two-wheeled off-road motorcycle, a two-wheeled scooter-type motorcycle, or a moped bicycle.

The roll axis Ax may pass through the roll rate sensor 602 or 1602. In this case, the roll rate sensor 602 or 1602 detects the roll rate ω still more accurately.

The posture control torque Td may be used for any other purpose than the posture control of the vehicle body frame 1021 around the roll axis Ax. The posture control torque Td may be used for posture control of the vehicle body frame 1021 around a yaw axis. The posture control torque Td may be used for posture control of the vehicle body frame 1021 around a pitch axis.

When the leaning vehicle 1*a* is running at a low speed, the supplementary steering torque Tc may be outputted to the steering shaft 62 to inhibit the vehicle body frame 21 from leaning in the leftward direction L or the rightward direction R. More specifically, the leaning-vehicle-steering-actuator controller 606 carries out such leaning inhibition control, for example, under the condition of 0 km/h<V≤20 km/h. When the front wheel 3 is steered leftward while the vehicle body frame 21 is leaning in the leftward direction L, a negative roll rate ω occurs, and when the front wheel 3 is steered rightward while the vehicle body frame 21 is leaning in the rightward direction R, a positive roll rate ω occurs.

Therefore, the current determination section 616 outputs a positive control current value I(m, n) when the vehicle body frame 21 is leaning in the leftward direction L (when the roll rate ω is a positive value). The steering actuator 600 outputs a positive supplementary steering torque Tc to the steering shaft 62. Accordingly, the front wheel 3 is steered leftward, and the vehicle body frame 21 is returning to the upright posture. The current determination section 616 outputs a negative control current value I(m, n) when the vehicle body frame 21 is leaning in the rightward direction R (when the roll rate ω is a negative value). The steering actuator 600 outputs a negative supplementary steering torque Tc to the steering shaft 62. Accordingly, the front wheel 3 is steered rightward, and the vehicle body frame 21 is returning to the upright posture. In this way, the vehicle body frame 21 of the leaning vehicle 1*a* is inhibited from leaning in the leftward direction L or the rightward direction R. Further, the leaning-vehicle-steering-actuator controller 606 may control the steering actuator 600 based on a yaw rate in addition to the roll rate ω. The yaw rate is an angular rate of a rotation of the vehicle body frame 21 around an axis extending along the up-side direction UD. Also, depending on the characteristics of the leaning vehicle 1*a*, the leaning-vehicle-steering-actuator controller 606 may control the steering actuator 600 to assist the leaning motion of the leaning vehicle 1*a*.

The leaning-vehicle-steering-actuator controller 606 may carry out a control process as described below. When the speed V is, for example, greater than 20 km/h, the leaning-vehicle-steering-actuator controller 606 controls the steering actuator 600 with reference to the estimated steering torque determination table as shown by TABLE 1 and the control current determination table as shown by FIG. 2. However, when the speed V is, for example, equal to or less than 20 km/h, the leaning-vehicle-steering-actuator controller 606 controls the steering actuator 600 to perform the above-described leaning inhibition control.

When the leaning vehicle 1*b* is running at a low speed, the posture control torque Td may be outputted to the upper cross member 1051 or the lower cross member 1052 to inhibit the vehicle body frame 1021 from leaning in the leftward direction L or the rightward direction R. More specifically, the actuator controller 1606 carries out the leaning inhibition control, for example, under the condition of 0 km/h<V≤20 km/h. The current determination section 1616 outputs a negative control current value I(m, n) when the vehicle body frame 1021 is leaning in the leftward direction L (when the roll rate ω is a positive value). The lean actuator 1600 outputs a negative posture control torque Td to the lower cross member 1052. Accordingly, the lower cross member 1052 rotates clockwise relative to the vehicle body frame 1021 in a view in the backward direction b, and the vehicle body frame 21 is returning to the upright posture. The current determination section 1616 outputs a positive control current value I(m, n) when the vehicle body frame 1021 is leaning in the rightward direction R (when the roll rate ω is a negative value). The lean actuator 1600 outputs a positive posture control torque Td to the lower cross member 1052. Accordingly, the lower cross member 1052 rotates counterclockwise relative to the vehicle body frame 1021 in a view in the backward direction b, and the vehicle body frame 1021 is returning to the upright posture. In this way, the vehicle body frame 1021 of the leaning vehicle 1b is inhibited from leaning in the leftward direction L or the rightward direction R. Further, the leaning-vehicle-steering-actuator controller 606 may control the lean actuator 1600 based on a yaw rate in addition to the roll rate ω. Also, depending on the characteristics of the leaning vehicle 1b, the actuator controller 1606 may control the lean actuator 1600 to assist the leaning motion of the leaning vehicle 1b.

The leaning-vehicle-steering-actuator controller 606 does not necessarily use the speed V and may use only the roll rate ω for control of the steering actuator 600. Alternatively, the leaning-vehicle-steering-actuator controller 606 may control the steering actuator 600 based on not only the roll rate ω but also any other parameter. The actuator controller 1606 does not necessarily use the speed V and may use only the roll rate ω for control of the lean actuator 1600. Alternatively, the actuator controller 1606 may control the lean actuator 1600 based on not only the roll rate ω but also any other parameter.

The lean actuator 1600 may output the posture control torque Td to the upper cross member 1051 instead of the lower cross member 1052. Alternatively, the lean actuator 1600 may output the posture control torque Td to the left side member 1053 or to the right side member 1054.

The roll rate sensor 602 and the leaning-vehicle-steering-actuator controller 606 may be connected to each other by an electrical signal line or an optical fiber. The speed sensor 604 and the leaning-vehicle-steering-actuator controller 606 may be connected to each other by an electrical signal line or an optical fiber. The roll rate sensor 602, the speed sensor 604 and the leaning-vehicle-steering-actuator controller 606 may be connected to one another by a CAN (controller area network) or any other connection means. When a CAN is used, various kinds of information are multiplexed and transmitted through the line interconnecting the roll rate sensor 602, the speed sensor 604 and the leaning-vehicle-steering-actuator controller 606. A connection means other than a CAN is, for example, connecting the roll rate sensor 602 and the leaning-vehicle-steering-actuator controller 606 by a line and connecting the speed sensor 604 and the leaning-vehicle-steering-actuator controller 606 by a line. Through the line connecting the roll rate sensor 602 and the leaning-vehicle-steering-actuator controller 606, only the roll rate ω is transmitted. Through the line connecting the speed sensor 604 and the leaning-vehicle-steering-actuator controller 606, only the speed V is transmitted.

The roll rate sensor 1602 and the actuator controller 1606 may be connected to each other by an electrical signal line or an optical fiber. The speed sensor 1604 and the actuator controller 1606 may be connected to each other by an electrical signal line or an optical fiber. The roll rate sensor 1602, the speed sensor 1604 and the actuator controller 1606 may be interconnected by a CAN or any other connection means. When a CAN is used, various kinds of information are multiplexed and transmitted through the line interconnecting the roll rate sensor 1602, the speed sensor 1604 and the actuator controller 1606. A connection means other than a CAN is, for example, connecting the roll rate sensor 1602 and the actuator controller 1606 by a line and connecting the speed sensor 1604 and the actuator controller 1606 by a line. Through the line connecting the roll rate sensor 1602 and the actuator controller 1606, only the roll rate ω is transmitted. Through the line connecting the speed sensor 1604 and the actuator controller 1606, only the speed V is transmitted.

The leaning vehicle 1b may further include a leaning-vehicle-steering-actuator controller 606 and a steering actuator 600. In this case, in the leaning vehicle 1b, the leaning vehicle steering control actuator controller 606 controls the steering actuator 600, and the actuator controller 1606 controls the lean actuator 1600. The operations of the leaning-vehicle-steering-actuator controller 606 of the leaning vehicle 1b are the same as the operations of the leaning-vehicle-steering-actuator controller 606 of the leaning vehicle 1a. Also, the leaning-vehicle-steering-actuator controller 606 and the actuator controller 1606 may change the assist rate depending on the speed V(m) and/or the roll rate ω(n). For example, when the leaning vehicle 1b is running at a low speed, the leaning-vehicle-steering-actuator controller 606 increases the assist rate of the steering actuator 600, and the actuator controller 1606 decreases the assist rate of the lean actuator 1600. On the other hand, when the leaning vehicle 1b is running at a high speed, the leaning-vehicle-steering-actuator controller 606 decreases the assist rate of the steering actuator 600, and the actuator controller 1606 increases the assist rate of the lean actuator 1600. However, how the assist rate is changed is not limited to this.

The leaning vehicles 1 and 1a may employ the drive-by-wire technology. Specifically, the handlebar 60 does not need to be mechanically connected to the front wheel 3. The handlebar 60 does not need to be mechanically connected to the at least one steerable wheel 3o. In this case, the steering actuator 600 steers the at least one steerable wheel 3o in accordance with the manipulation of the handlebar 60. In this regard, the force applied to the handlebar 60 is not transmitted to the at least one steerable wheel 3o. In this case, the steering actuator 600 steers the front wheel 3 in accordance with the manipulation of the handlebar 60. In this regard, the force applied to the handlebar 60 is not transmitted to the front wheel 3.

REFERENCE SIGNS LIST 1, 1a leaning vehicle
2, 1002 vehicle body
3 front wheel
3o at least one steerable wheel
4, 1004 rear wheel
7, 1007 steering mechanism
21, 1021 vehicle body frame
24, 1024 seat
25, 1025 power unit
60, 1060 handlebar
62, 1062 steering shaft
64 front fork
64L, 1033 left shock absorber
64R, 1034 right shock absorber
66 upper bracket
68 under bracket
211, 1211 head pipe
600 steering actuator
602, 1602 roll rate sensor
604, 1604 speed sensor
606 leaning-vehicle-steering-actuator controller
614, 1614 torque estimation section
616, 1616 current determination section
1005 link mechanism
1031 left front wheel 1032 right front wheel
1051 upper cross member
1052 lower cross member
1053 left side member
1054 right side member
1067 tie rod
1314 left front axle
1317 left bracket
1324 right front axle
1327 right bracket
1337 center bracket
1052A front lower cross member
1052B rear lower cross member
1600 lean actuator
1606 actuator controller
Ax roll axis

The invention claimed is:

1. A steering actuator controller for a leaning vehicle, the leaning vehicle including:
   a vehicle body frame configured to lean in a leaning-vehicle-leftward direction when the leaning vehicle is turning left and to lean in a leaning-vehicle-rightward direction when the leaning vehicle is turning right,
   at least one steerable wheel supported by the vehicle body frame,
   a handlebar configured to be manipulatable by a rider of the leaning vehicle to steer the at least one steerable wheel, the handle bar being supported by the vehicle body frame in a rotatable manner, the manipulation of the handlebar by the rider causing the handlebar to rotate around a rotation axis thereof to thereby generate a first steering torque,
   a steering actuator configured to apply a second steering torque to the at least one steerable wheel to steer the at least one steerable wheel, and
   a roll rate sensor configured to detect a roll rate that is an amount of change per unit time of a roll angle of the vehicle body frame around a roll axis extending along a front-back direction of the leaning vehicle, the roll angle changing as the vehicle body frame is rotating around the roll axis,
   the steering actuator controller comprising:
   a processor, and
   a non-transitory storage medium containing program instructions, execution of which by the processor causes the steering actuator controller to provide functions of:
     a receiving section that receives an input, and a control section that controls the steering actuator, wherein
     the input that the receiving section receives and based on which the control section controls the steering actuator includes the roll rate obtained from the roll rate sensor, but is free from any value of the first steering torque detected by a torque sensor, and
     the control section is configured to control the steering actuator so that the second steering torque generated thereby
       rotates the handlebar clockwise when the vehicle body frame leans to the leaning-vehicle-leftward direction, and
       rotates the handlebar counterclockwise when the vehicle body frame leans to the leaning-vehicle-rightward direction.

2. The steering actuator controller according to claim 1, wherein the input that the receiving section receives and based on which the control section controls the steering actuator does not contain the roll angle detected by a roll sensor.

3. The steering actuator controller according to claim 1, wherein:
   the leaning vehicle further includes a speed sensor configured to detect a speed of the leaning vehicle, and
   the input that the receiving section receives and based on which the control section controls the steering actuator further includes the speed of the leaning vehicle obtained from the speed sensor, so that the control section controls the steering actuator based on both the roll rate and the speed of the leaning vehicle.

4. The steering actuator controller according to claim 1, wherein:
   the leaning vehicle further includes a speed sensor configured to detect a speed of the leaning vehicle, and
   the input that the receiving section receives and based on which the control section controls the steering actuator further includes the speed of the leaning vehicle obtained from the speed sensor, so that the control section generates an estimated value of the first steering torque based on both the roll rate and the speed of the leaning vehicle, and controls the steering actuator based on the estimated value of the first steering torque.

5. A leaning vehicle comprising:
   a vehicle body frame configured to lean in a leaning-vehicle-leftward direction when the leaning vehicle is turning left and to lean in a leaning-vehicle-rightward direction when the leaning vehicle is turning right;
   at least one steerable wheel supported by the vehicle body frame;
   a handlebar configured to be manipulatable by a rider of the leaning vehicle to steer the at least one steerable wheel, the handle bar being supported by the vehicle body frame in a rotatable manner, the manipulation of the handlebar by the rider causing the handlebar to rotate around a rotation axis thereof to thereby generate a first steering torque;
   a steering actuator configured to apply a second steering torque to the at least one steerable wheel to steer the at least one steerable wheel;
   a roll rate sensor configured to detect a roll rate that is an amount of change per unit time of a roll angle of the vehicle body frame around a roll axis extending along a front-back direction of the leaning vehicle, the roll angle changing as the vehicle body frame is rotating around the roll axis; and
   a steering actuator controller, including:
     a processor, and
     a non-transitory storage medium containing program instructions, execution of which by the processor causes the steering actuator controller to provide functions of:
       a receiving section that receives an input, and
       a control section that controls the steering actuator, wherein
       the input that the receiving section receives and based on which the control section controls the steering actuator includes the roll rate obtained from the roll rate sensor, but is free from any value of the first steering torque detected by a torque sensor, and
       the control section is configured to se control the steering actuator so that the second steering torque generated thereby rotates the handlebar clockwise when the vehicle body frame leans to the leaningvehicle-leftward direction, and rotates the handlebar counterclockwise when the vehicle body frame leans to the leaning-vehicle-rightward direction.

6. The leaning vehicle according to claim 5, wherein the roll rate sensor is supported by the vehicle body frame in such a manner as not to be displaceable relative to the vehicle body frame.

7. The leaning vehicle according to claim 5, wherein the input that the receiving section receives and based on which the torque control section controls the steering actuator does not contain the roll angle detected by a roll sensor.

8. The leaning vehicle according to claim 5, wherein:
   the leaning vehicle further includes a speed sensor configured to detect a speed of the leaning vehicle, and
   the input that the receiving section receives and based on which the control section controls the steering actuator further includes the speed of the leaning vehicle obtained from the speed sensor, so that the control section controls the steering actuator based on both the roll rate and the speed of the leaning vehicle.

9. The leaning vehicle according to claim 5, wherein:
   the leaning vehicle further includes a speed sensor configured to detect a speed of the leaning vehicle, and
   the input that the receiving section receives and based on which the control section controls the steering actuator further includes the speed of the leaning vehicle obtained from the speed sensor, so that the control section generates an estimated value of the first steering torque based on both the roll rate and the speed of the leaning vehicle, and controls the steering actuator based on the estimated value of the first steering torque.

* * * * *